(12) United States Patent
Iwamoto et al.

(10) Patent No.: US 11,648,755 B2
(45) Date of Patent: May 16, 2023

(54) LAMINATED GLASS INTERMEDIATE FILM AND LAMINATED GLASS

(71) Applicant: SEKISUI CHEMICAL CO., LTD., Osaka (JP)

(72) Inventors: Tatsuya Iwamoto, Kouka (JP); Yuu Sakamoto, Kouka (JP); Yuki Ishikawa, Osaka (JP); Shinji Kawada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 150 days.

(21) Appl. No.: 16/478,433

(22) PCT Filed: Feb. 2, 2018

(86) PCT No.: PCT/JP2018/003707
§ 371 (c)(1),
(2) Date: Jul. 16, 2019

(87) PCT Pub. No.: WO2018/143443
PCT Pub. Date: Aug. 9, 2018

(65) Prior Publication Data
US 2019/0366691 A1    Dec. 5, 2019

(30) Foreign Application Priority Data

Feb. 3, 2017 (JP) .............................. JP2017-019045
Feb. 3, 2017 (JP) .............................. JP2017-019046

(51) Int. Cl.
*B32B 17/10* (2006.01)
*B32B 27/22* (2006.01)
(Continued)

(52) U.S. Cl.
CPC .. *B32B 17/10761* (2013.01); *B32B 17/10036* (2013.01); *B32B 17/10605* (2013.01);
(Continued)

(58) Field of Classification Search
CPC ........... B32B 27/30; B32B 9/00; B32B 27/08; C09D 4/00; C08F 222/1045
See application file for complete search history.

(56) References Cited

U.S. PATENT DOCUMENTS

2003/0139520 A1    7/2003  Toyama et al.
2005/0196625 A1    9/2005  Toyama et al.
(Continued)

FOREIGN PATENT DOCUMENTS

CA    2 967 559 A1    10/2016
CN    201121169 Y     9/2008
(Continued)

OTHER PUBLICATIONS

JP-2008222513-A Machine Translation (Year: 2008).*
(Continued)

*Primary Examiner* — Travis M Figg
(74) *Attorney, Agent, or Firm* — Cheng Law Group, PLLC

(57) ABSTRACT

Provided is an interlayer film for laminated glass capable of enhancing the sound insulating properties of laminated glass, and making foaming less likely to occur in an end part. The interlayer film for laminated glass according to the present invention includes a first layer, and a lateral covering part that covers at least part of a lateral part of the first layer, and the first layer has a shear elastic modulus at 25° C. of 0.17 MPa or less, and the lateral covering part has a shear elastic modulus at 25° C. of more than 1 MPa.

19 Claims, 4 Drawing Sheets

(51) Int. Cl.
  *B32B 27/30* (2006.01)
  *B32B 27/08* (2006.01)
(52) U.S. Cl.
  CPC .. *B32B 17/10678* (2013.01); *B32B 17/10688* (2013.01); *B32B 17/10743* (2013.01); *B32B 27/08* (2013.01); *B32B 27/22* (2013.01); *B32B 27/30* (2013.01); *B32B 27/308* (2013.01); *B32B 2307/102* (2013.01); *B32B 2315/08* (2013.01); *B32B 2333/12* (2013.01); *B32B 2419/00* (2013.01); *B32B 2605/006* (2013.01)

(56) References Cited

U.S. PATENT DOCUMENTS

| | | | |
|---|---|---|---|
| 2007/0093581 | A1 | 4/2007 | Toyama et al. |
| 2008/0032138 | A1 | 2/2008 | Toyama et al. |
| 2010/0233453 | A1 | 9/2010 | Hashimoto |
| 2011/0064957 | A1 | 3/2011 | Toyama et al. |
| 2011/0070415 | A1 | 3/2011 | Nakamura et al. |
| 2011/0112247 | A1 | 5/2011 | Tokuchi et al. |
| 2012/0003482 | A1 | 1/2012 | Toyama et al. |
| 2012/0094084 | A1 | 4/2012 | Fisher et al. |
| 2012/0325396 | A1 | 12/2012 | Toyama et al. |
| 2013/0236693 | A1 | 9/2013 | Lu |
| 2013/0236711 | A1 | 9/2013 | Lu |
| 2014/0349124 | A1 | 11/2014 | Shimamoto et al. |
| 2015/0030860 | A1 | 1/2015 | Shimamoto et al. |
| 2015/0101736 | A1 | 4/2015 | Izutani et al. |
| 2016/0136931 | A1 | 5/2016 | Nakamura et al. |
| 2016/0236446 | A1* | 8/2016 | Nakayama ........ B32B 17/10678 |
| 2016/0250825 | A1* | 9/2016 | Cleary ............. B32B 17/10137 428/215 |
| 2016/0271911 | A1 | 9/2016 | Kusudou et al. |
| 2016/0311199 | A1* | 10/2016 | Iwamoto ................ B32B 27/22 |
| 2017/0028687 | A1 | 2/2017 | Derosa et al. |
| 2017/0334173 | A1* | 11/2017 | Yui ................... B32B 17/10605 |
| 2018/0001598 | A1 | 1/2018 | Mikayama et al. |
| 2018/0001599 | A1 | 1/2018 | Mikayama et al. |
| 2018/0037008 | A1 | 2/2018 | Nakayama |
| 2018/0104931 | A1 | 4/2018 | Asanuma et al. |

FOREIGN PATENT DOCUMENTS

| | | | | |
|---|---|---|---|---|
| CN | 102007082 | A | | 4/2011 |
| CN | 102015881 | A | | 4/2011 |
| CN | 103796967 | A | | 5/2014 |
| CN | 105848894 | A | | 8/2016 |
| EP | 3 219 686 | A1 | | 9/2017 |
| EP | 3 296 846 | A1 | | 3/2018 |
| JP | 2004143008 | A | * | 5/2004 |
| JP | 2005-29083 | A | | 2/2005 |
| JP | 2007-70200 | A | | 3/2007 |
| JP | 2007-331964 | A | | 12/2007 |
| JP | 2008-222513 | A | | 9/2008 |
| JP | 2008222513 | A | * | 9/2008 ....... B32B 17/10036 |
| JP | 2008-230894 | A | | 10/2008 |
| JP | 2008303084 | A | * | 12/2008 |
| JP | 2008303084 | A | | 12/2008 |
| JP | 2013-163627 | A | | 8/2013 |
| JP | 2013163627 | A | * | 8/2013 |
| JP | 2016-64965 | A | | 4/2016 |
| KR | 10-0458923 | B1 | | 12/2004 |
| KR | 10-2016-0067153 | A | | 6/2016 |
| TW | 201638191 | A | | 11/2016 |
| TW | 201704301 | A | | 2/2017 |
| WO | WO-2008/111388 | A1 | | 9/2008 |
| WO | WO-2008111388 | A1 | * | 9/2008 ....... B32B 17/10036 |
| WO | WO-2013/042771 | A1 | | 3/2013 |
| WO | WO-2015/054112 | A1 | | 4/2015 |
| WO | WO-2015108119 | A1 | * | 7/2015 ............. B32B 17/10 |
| WO | WO-2016/076336 | A1 | | 5/2016 |
| WO | WO-2016/076339 | A1 | | 5/2016 |
| WO | WO-2016094230 | A1 | | 6/2016 |
| WO | WO-2016/158696 | A1 | | 10/2016 |
| WO | WO-2016/158882 | A1 | | 10/2016 |
| WO | WO-2016/186029 | A1 | | 11/2016 |

OTHER PUBLICATIONS

JP-2004143008-A Machine Translation.*
Supplementary European Search Report for the Application No. EP 18 748 072.8 dated Oct. 20, 2020.
Supplementary European Search Report for the Application No. EP 18 748 689.9 dated Oct. 23, 2020.
International Search Report for the Application No. PCT/JP2018/003707 dated Mar. 27, 2018.
Written Opinion of the International Searching Authority (PCT/ISA/237) for Application No. PCT/JP2018/003707 dated Mar. 27, 2018.
Taiwanese Office Action for the Application No. 107104033 dated Mar. 19, 2021.
Written Opinion of the International Searching Authority (PCT/ISA/237) for Application No. PCT/JP2018/003707 dated Mar. 27, 2018 (English Translation mailed Aug. 15, 2019).
International Search Report for the Application No. PCT/JP2018/003706 dated Mar. 20, 2018.
Written Opinion of the International Searching Authority (PCT/ISA/237) for Application No. PCT/JP2018/003706 dated Mar. 20, 2018 (English Translation mailed Aug. 15, 2019).
The First Office Action for the Application No. 201880005827.8 from The State Intellectual Property Office of the People's Republic of China dated Jun. 25, 2021.
The First Office Action for the Application No. 201880005981.5 from The State Intellectual Property Office of the People's Republic of China dated Jun. 25, 2021.
Non-Final Office Action for the U.S. Appl. No. 16/478,329 from United States Patent and Trademark Office dated Oct. 27, 2021.
Final Office Action for the U.S. Appl. No. 16/478,329 from United States Patent and Trademark Office dated May 23, 2022.
Non-Final Office Action for the U.S. Appl. No. 16/478,329 from United States Patent and Trademark Office dated Sep. 15, 2022.
Korean Office Action for the Application No. 10-2019-7014550 dated Nov. 21, 2022.
Korean Office Action for Application No. 10-2019-7014551 dated Nov. 21, 2022.
European Office Action for the Application No. 18 748 072.8 dated Feb. 1, 2023.
European Office Action for the Application No. 18 748 689.9 dated Feb. 3, 2023.

* cited by examiner

[FIG. 1]
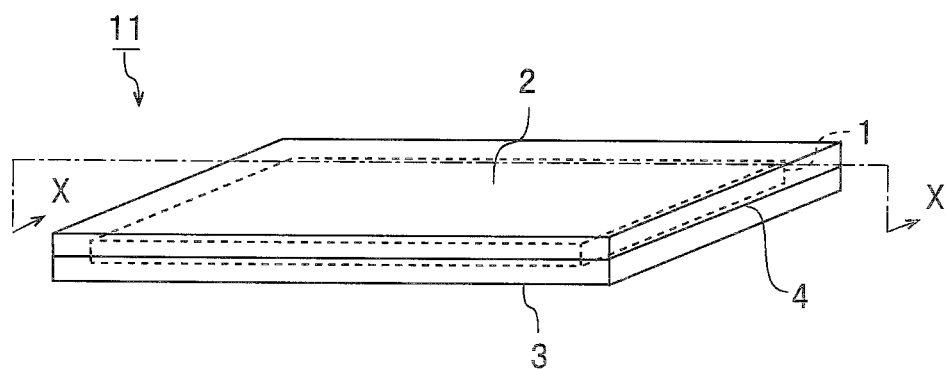
[FIG. 2]
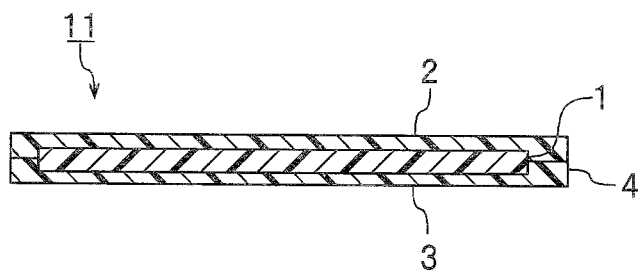
[FIG. 3]
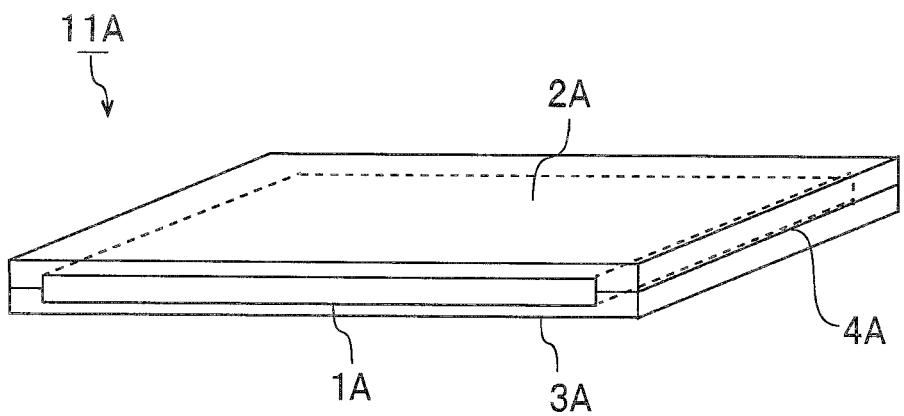

[FIG. 4]
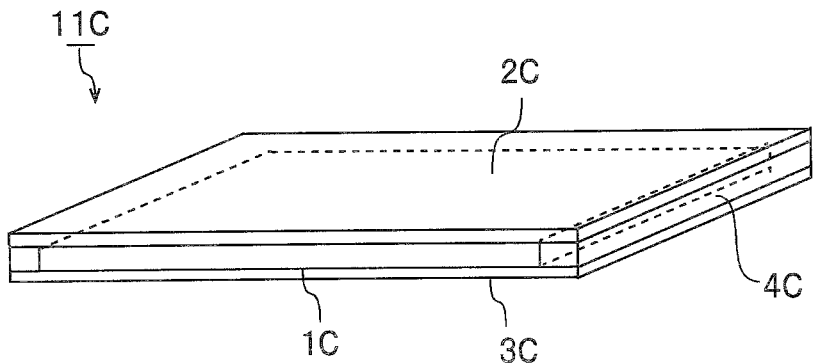
[FIG. 5]
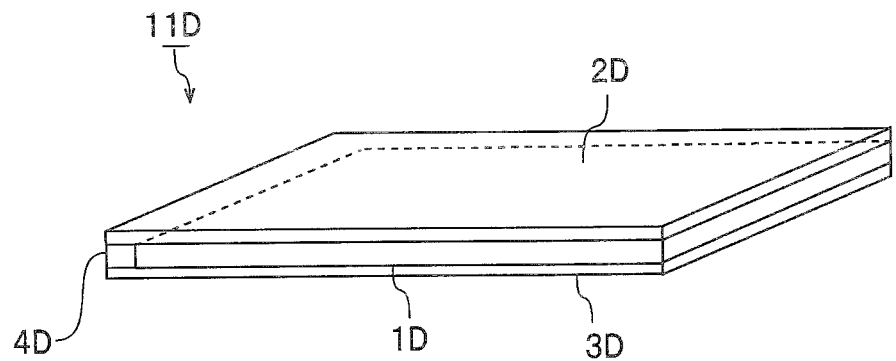
[FIG. 6]
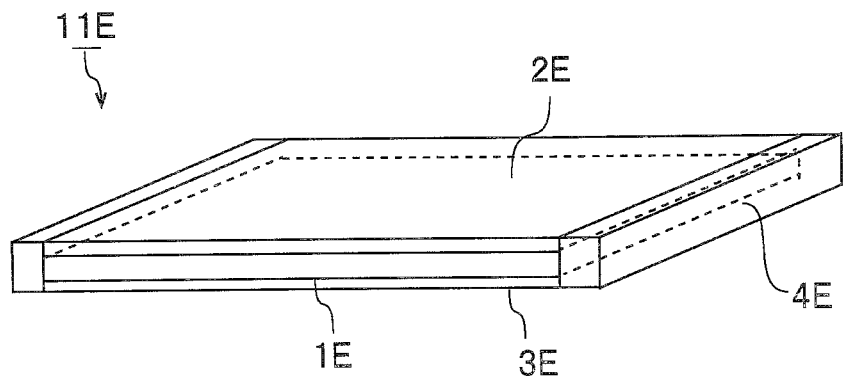
[FIG. 7]
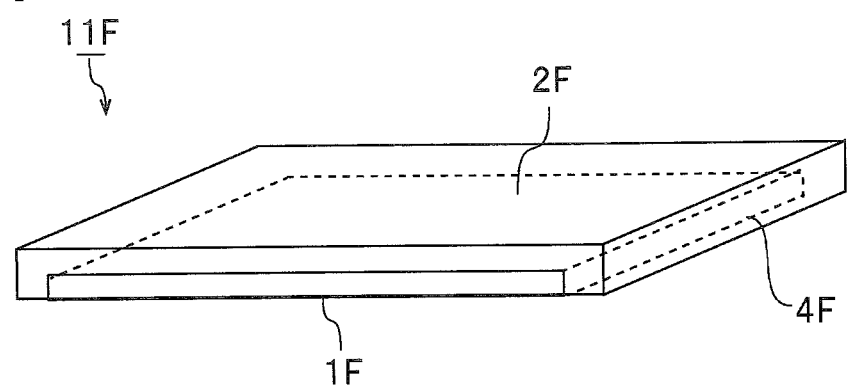

[FIG. 8]
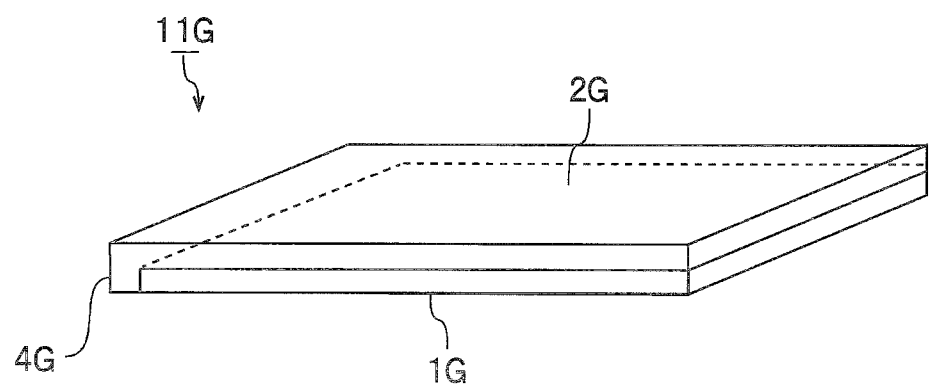
[FIG. 9]
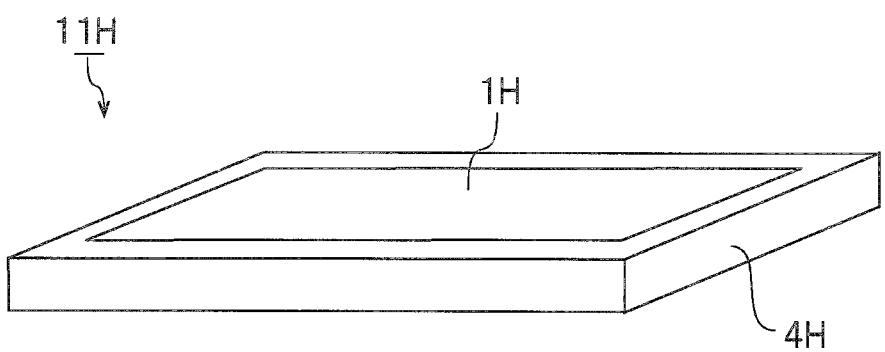
[FIG. 10]
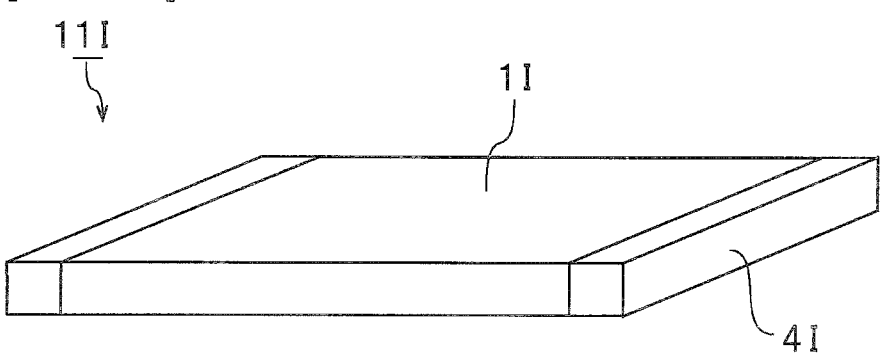
[FIG. 11]
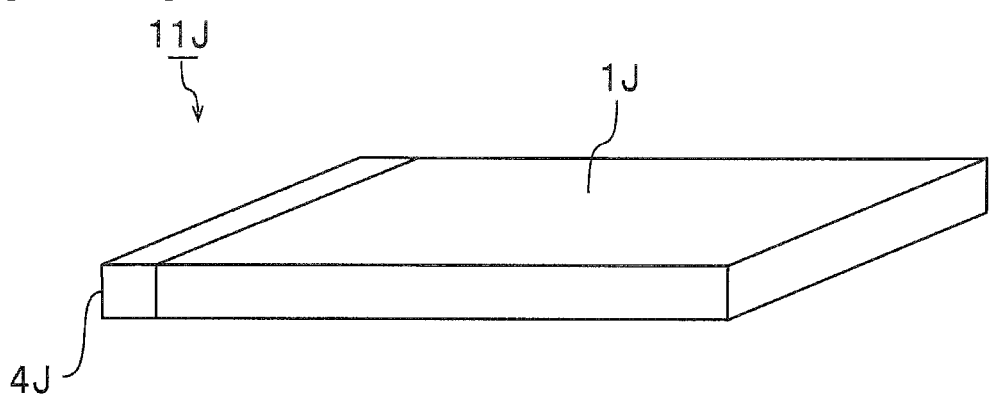

[FIG. 12]
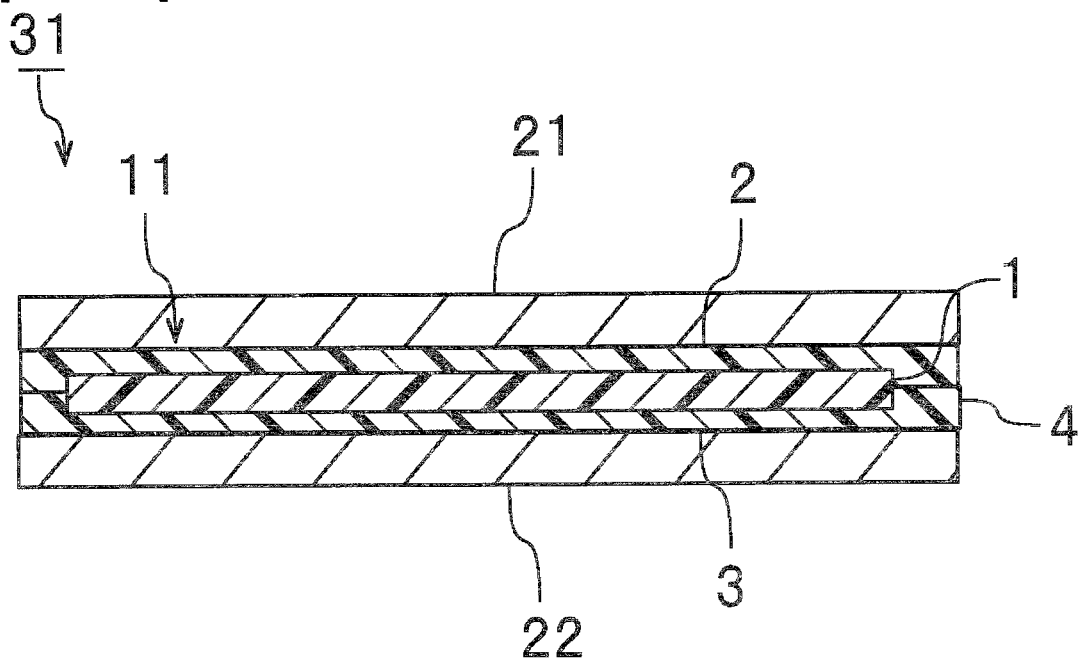
[FIG. 13]
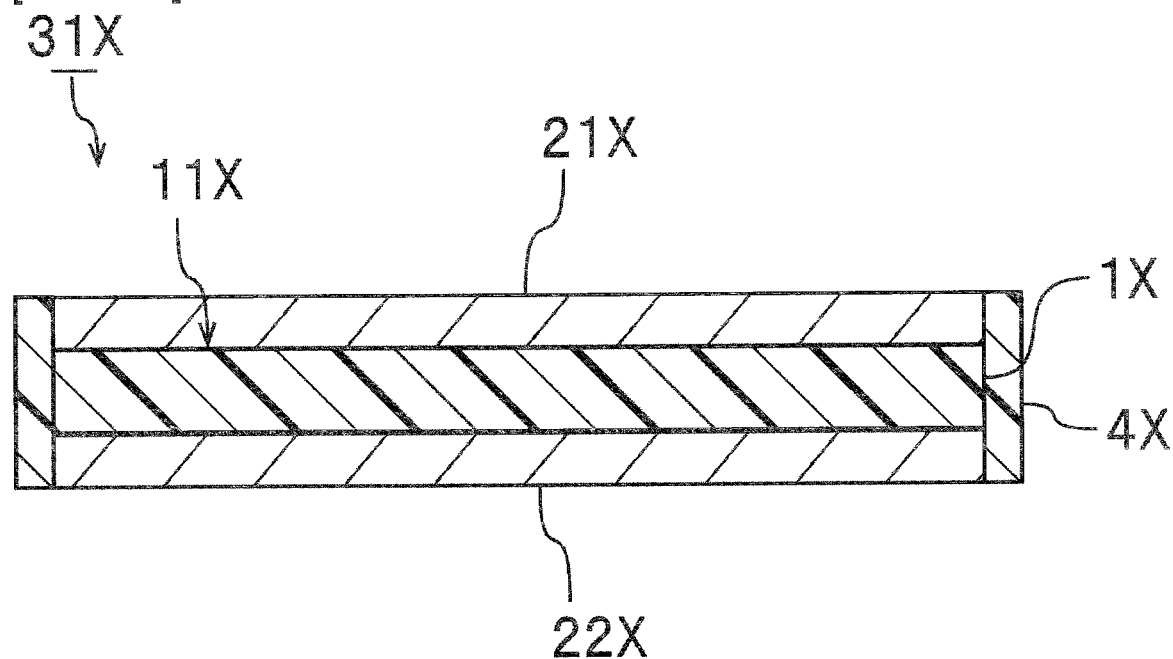

LAMINATED GLASS INTERMEDIATE FILM AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, the laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film including a first region having a first elastic modulus of about 1 MPa to 20 MPa, and a second region having a second elastic modulus of about 2 to 15 MPa. The second region may surround the first region.

The following Patent Document 3 discloses an interlayer film in which a resin layer (B) containing polyethylene terephthalate is arranged between two resin layers (A) containing a transparent adhesive resin. End parts of the resin layers (A) protrude from an end part of the resin layer (B). An end part of the resin layer (B) may be covered with end parts of the resin layers (A).

RELATED ART DOCUMENTS

Patent Documents

Patent Document 1: JP 2007-070200 A
Patent Document 2: WO 2015/054112 A1
Patent Document 3: JP 2008-303084 A

SUMMARY OF THE INVENTION

Problems to be Solved by the Invention

For achieving comfortable driving of automobile, it is desired to reduce in-car noises. Examples of the in-car noises include noises by engine drive, noises caused by the tread patterns of the tires on travelling, noises by vibrations of the chassis on travelling, noises by vibrations of the suspensions on travelling, noises by wind on travelling and the like. Against such noises, it is desired to improve the sound insulating properties in the medium frequency range of from 2000 Hz to 4000 Hz of the laminated glass.

Also, in recent years, shifting of fuel automobiles powered by an internal combustion engine to electric automobiles has been advanced. Examples of the electric automobiles include electric automobiles powered by an electric motor, hybrid electric automobiles powered by an internal combustion engine and an electric motor, and the like. In electric automobiles, noises in the high frequency range exceeding 4000 Hz are generated by the drive of the electric motor. In electric automobiles, it is desired to improve the sound insulating properties of the laminated glass in the high frequency range exceeding 4000 Hz. Also in fuel automobiles powered by an internal combustion engine, it is desired that the laminated glass have excellent sound insulating properties in the high frequency range exceeding 4000 Hz.

Also in laminated glass used in a construction or the like, it is desired that the laminated glass have excellent sound insulating properties in the middle to high frequency range.

However, in laminated glass using the conventional interlayer film as described in Patent Documents 1 to 3, the sound insulating properties cannot be increased sufficiently.

As a result of the investigation, the present inventors found that the sound insulating properties can be enhanced by lowering the shear elastic modulus at room temperature of the interlayer film. As a result of the investigation, the present inventors discovered the problem that foaming occurs in an end part of the interlayer film of laminated glass or plate slippage in laminated glass occurs when the shear elastic modulus at room temperature is lowered so as to enhance the sound insulating properties.

An object of the present invention is to provide an interlayer film for laminated glass capable of enhancing the sound insulating properties of laminated glass, and making foaming less likely to occur in an end part. Moreover, the present invention is also aimed at providing laminated glass prepared with the interlayer film for laminated glass.

Means for Solving the Problems

According to a broad aspect of the present invention, there is provided an interlayer film for laminated glass (hereinafter, sometimes described as interlayer film) having a one-layer structure or a two or more-layer structure, the interlayer film including: a first layer having a first principal surface and a second principal surface that are opposed to each other, and a lateral part connecting the first principal surface and the second principal surface; and a lateral covering part that covers at least part of the lateral part of the first layer, the first layer having a shear elastic modulus at 25° C. of 0.17 MPa or less, the lateral covering part having a shear elastic modulus at 25° C. of more than 1 MPa.

In a specific aspect of the interlayer film according to the present invention, the first layer contains a thermoplastic resin, or contains a cured product of a photocurable compound or a moisture-curable compound.

In a specific aspect of the interlayer film according to the present invention, the first layer contains a thermoplastic resin and a plasticizer.

In a specific aspect of the interlayer film according to the present invention, the lateral covering part contains a thermoplastic resin and a plasticizer.

In a specific aspect of the interlayer film according to the present invention, the first layer contains a thermoplastic resin and a plasticizer, the lateral covering part contains a thermoplastic resin and a plasticizer, a content of the plasticizer in the first layer, relative to 100 parts by weight of the thermoplastic resin in the first layer is larger than a content of the plasticizer in the lateral covering part, relative to 100 parts by weight of the thermoplastic resin in the lateral covering part by 15 parts by weight or more.

In a specific aspect of the interlayer film according to the present invention, the lateral covering part has a thickness of 0.05 mm or more and 2 mm or less.

In a specific aspect of the interlayer film according to the present invention, in 100% of a length of one round of the lateral part which is an outer periphery of the first layer, a length of the lateral part covered with the lateral covering part is 15% or more and 100% or less.

In a specific aspect of the interlayer film according to the present invention, in 100% of an entire surface area of the lateral part of the first layer, a surface area covered with the lateral covering part is 15% or more and 100% or less.

In a specific aspect of the interlayer film according to the present invention, the interlayer film is an interlayer film for laminated glass having a two or more-layer structure, and includes a second layer arranged on the first principal surface of the first layer.

In a specific aspect of the interlayer film according to the present invention, the second layer covers at least part of the lateral part of the first layer by reaching at least part of the lateral part of the first layer, and the lateral covering part is constituted by the second layer.

In a specific aspect of the interlayer film according to the present invention, the second layer is made of a material that is different from a material of the lateral covering part.

In a specific aspect of the interlayer film according to the present invention, the second layer contains a thermoplastic resin and a plasticizer.

In a specific aspect of the interlayer film according to the present invention, the interlayer film is an interlayer film for laminated glass having a three or more-layer structure, and includes a third layer arranged on the second principal surface of the first layer.

In a specific aspect of the interlayer film according to the present invention, the third layer covers at least part of the lateral part of the first layer by reaching at least part of the lateral part of the first layer, and the lateral covering part is constituted by the third layer.

In a specific aspect of the interlayer film according to the present invention, the third layer is made of a material that is different from a material of the lateral covering part.

In a specific aspect of the interlayer film according to the present invention, the third layer contains a thermoplastic resin and a plasticizer.

In a specific aspect of the interlayer film according to the present invention, when the interlayer film has a thickness T, the first layer has a thickness of 0.06T or more.

According to a broad aspect of the present invention, there is provided laminated glass including a first lamination glass member, a second lamination glass member, and the interlayer film for laminated glass described above, the interlayer film for laminated glass being arranged between the first lamination glass member and the second lamination glass member.

In a specific aspect of laminated glass according to the present invention, the lateral covering part of the interlayer film for laminated glass reaches on at least part of lateral parts of the first lamination glass member and the second lamination glass member.

Effect of the Invention

The interlayer film for laminated glass according to the present invention has a one-layer structure or a two or more-layer structure. The interlayer film for laminated glass according to the present invention includes a first layer having a first principal surface and a second principal surface that are opposed to each other, and a lateral part connecting the first principal surface and the second principal surface; and a lateral covering part that covers at least part of the lateral part of the first layer. In the interlayer film for laminated glass according to the present invention, the first layer has a shear elastic modulus at 25° C. of 0.17 MPa or less, and the lateral covering part has a shear elastic modulus at 25° C. of more than 1 MPa. Since the interlayer film for laminated glass according to the present invention has the configuration as described above, it is possible to enhance the sound insulating properties and make foaming less likely to occur in an end part in the present invention.

BRIEF DESCRIPTION OF DRAWINGS

FIGS. 1(a) and (b) are a perspective view and a sectional view, respectively, schematically showing an interlayer film for laminated glass, in accordance with a first embodiment of the present invention.

FIG. 2 is a perspective view schematically showing an interlayer film for laminated glass in accordance with a second embodiment of the present invention.

FIG. 3 is a perspective view schematically showing an interlayer film for laminated glass in accordance with a third embodiment of the present invention.

FIG. 4 is a perspective view schematically showing an interlayer film for laminated glass in accordance with a fourth embodiment of the present invention.

FIG. 5 is a perspective view schematically showing an interlayer film for laminated glass in accordance with a fifth embodiment of the present invention.

FIG. 6 is a perspective view schematically showing an interlayer film for laminated glass in accordance with a sixth embodiment of the present invention.

FIG. 7 is a perspective view schematically showing an interlayer film for laminated glass in accordance with a seventh embodiment of the present invention.

FIG. 8 is a perspective view schematically showing an interlayer film for laminated glass in accordance with an eighth embodiment of the present invention.

FIG. 9 is a perspective view schematically showing an interlayer film for laminated glass in accordance with a ninth embodiment of the present invention.

FIG. 10 is a perspective view schematically showing an interlayer film for laminated glass in accordance with a tenth embodiment of the present invention.

FIG. 11 is a perspective view schematically showing an interlayer film for laminated glass in accordance with an eleventh embodiment of the present invention.

FIG. 12 is a sectional view schematically showing laminated glass in accordance with a first embodiment.

FIG. 13 is a sectional view schematically showing laminated glass in accordance with a second embodiment.

MODE(S) FOR CARRYING OUT THE INVENTION

Hereinafter, the present invention will be described in detail.

The interlayer film for laminated glass according to the present invention (hereinafter, sometimes described as interlayer film) has a one-layer structure or a two or more-layer structure. The interlayer film according to the present invention may have a one-layer structure or may have a two or more-layer structure. The interlayer film according to the present invention may have a two-layer structure or may have a three or more-layer structure. The interlayer film according to the present invention may be an interlayer film having a one-layer structure provided with only a first layer (single-layered interlayer film) or may be an interlayer film having two or more-layer structure provided with a first layer and other layer (multi-layered interlayer film).

The interlayer film according to the present invention includes a first layer. The first layer has a first principal surface and a second principal surface that are opposed to each other, and a lateral part connecting the first principal surface and the second principal surface.

In the interlayer film according to the present invention, the first layer has a shear elastic modulus at 25° C. of 0.17 MPa or less, and the lateral covering part has a shear elastic modulus at 25° C. of more than 1 MPa.

Since the interlayer film according to the present invention has the configuration as described above, it is possible to enhance the sound insulating properties and make foaming less likely to occur in an end part in the present invention.

Since the first layer has a relatively small shear elastic modulus, the sound insulating properties are enhanced. On the other hand, since at least part of the lateral part of the first layer is covered with the lateral covering part having a relatively large shear elastic modulus, it is possible to make foaming less likely to occur in an end part. Further, since at least part of the lateral part of the first layer is covered with the lateral covering part having a relatively large shear elastic modulus, it is possible to prevent plate slippage.

The "plate slippage" refers to the phenomenon that one glass plate is slipped with respect to the other glass plate owing to the weight of the glass plate, for example, when laminated glass plates are stored in a high-temperature environment while they are leaned.

From the viewpoint of further enhancing the sound insulating properties, the shear elastic modulus at 25° C. of the first layer is preferably 0.165 MPa or less, more preferably 0.16 MPa or less. The shear elastic modulus at 25° C. of the first layer may be 0.01 MPa or more.

From the viewpoints of further preventing foaming in an end part, and further preventing plate slippage, the shear elastic modulus at 25° C. of the lateral covering part is preferably 3 MPa or more, more preferably 5 MPa or more. The shear elastic modulus at 25° C. of the lateral covering part may be 100 MPa or less.

Hereinafter, specific embodiments of the present invention will be described with reference to the drawings.

FIGS. 1(a) and (b) are a perspective view and a sectional view, respectively, schematically showing an interlayer film for laminated glass, in accordance with a first embodiment of the present invention. FIG. 1(b) is a sectional view along the line X-X in FIG. 1(a). In FIG. 1 and the later-described drawings, different points are replaceable.

An interlayer film 11 shown in FIG. 1 is a multi-layered interlayer film having a two or more-layer structure, and is specifically a multi-layered interlayer film having a three-layer structure. The interlayer film 11 is used for obtaining laminated glass. The interlayer film 11 is an interlayer film for laminated glass. The interlayer film 11 has a rectangular planar shape.

The interlayer film 11 is provided with a first layer 1, a second layer 2 and a third layer 3. The interlayer film 11 includes a lateral covering part 4.

The first layer 1 has a first principal surface and a second principal surface that are opposed to each other. The first layer 1 has a lateral part connecting the first principal surface and the second principal surface. In the present embodiment, the lateral part is planar, and is a lateral surface. The first layer 1 has four lateral surfaces. The lateral part may be linear. An end part of the first layer may be tapered.

The second layer 2 is arranged on the first principal surface of the first layer 1 to be layered thereon. The third layer 3 is arranged on the second principal surface of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In this connection, other layers may be arranged between the second layer 2 and the first layer 1 and between the first layer 1 and the third layer 3, respectively. It is preferred that the second layer 2 and the first layer 1, and the first layer 1 and the third layer 3 be directly layered.

The lateral covering part 4 covers the entire lateral part of the first layer 1. Specifically, the entire four lateral surfaces of the first layer 1 are covered with the lateral covering part 4.

The second layer 2 reaches the center of the lateral part of the first layer 1. As a result, the second layer 2 covers a half region of the lateral part of the first layer 1. The second layer 2 constitutes the lateral covering part 4.

The third layer 3 reaches the center of the lateral part of the first layer 1. As a result, the third layer 3 covers a half region of the lateral part of the first layer 1. The third layer 3 constitutes the lateral covering part 4.

Therefore, the second layer 2 and the third layer 3 constitute the entire lateral covering part 4.

The second layer 2 and the third layer 3 cover the entire first layer 1.

Of the second layer and the third layer, only the second layer may reach the lateral part of the first layer, or only the third layer may reach the lateral part of the first layer.

FIG. 2 is a perspective view schematically showing an interlayer film for laminated glass in accordance with a second embodiment of the present invention.

An interlayer film 11A shown in FIG. 2 includes a first layer 1A, a second layer 2A, and a third layer 3A. The interlayer film 11A includes a lateral covering part 4A. In the interlayer film 11A, unlike the interlayer film 11, only two opposed lateral surfaces among the four lateral surfaces of the first layer 1A are covered with the lateral covering part 4A (the right side and the left side in FIG. 2). The second layer 2A and the third layer 3A constitute the lateral covering part 4A. Among the four lateral surfaces of the first layer 1A, opposed two lateral surfaces are not covered with the lateral covering part 4A and thus exposed (the front side and the back side in FIG. 2).

In the case of the configurations of the interlayer film 11A, and interlayer films 11C, 11E, 11F, 11I as will be described later, for example, in a windshield of an automobile, it is possible to further prevent plate slippage by arranging the interlayer film so that the lateral covering part 4A, 4C, 4E, 4F, 4I is located upside and downside the windshield.

Also, in a windshield of an automobile, the windshield is sometimes arranged so that two sides are covered up to make only two sides well visible. In such a case, the interlayer films 11A, 11C, 11E, 11F, 11I can be preferably used.

FIG. 3 is a perspective view schematically showing an interlayer film for laminated glass in accordance with a third embodiment of the present invention.

An interlayer film 11B shown in FIG. 3 includes a first layer 1B, a second layer 2B, and a third layer 3B. The interlayer film 11B includes a lateral covering part 4B. In the interlayer film 11B, unlike the interlayer film 11, only one lateral surface among the four lateral surfaces of the first layer 1B is covered with the lateral covering part 4B (the left side in FIG. 3). The second layer 2B and the third layer 3B constitute the lateral covering part 4B. Among the four lateral surfaces of the first layer 1B, three lateral surfaces are not covered with the lateral covering part 4B and thus exposed (the front side, the back side and the right side in FIG. 3).

In the case of the configurations of the interlayer film 11B, and interlayer films 11D, 11G, 11J as will be described later, for example, in a windshield of an automobile, it is possible to further prevent plate slippage by arranging the interlayer film so that the lateral covering part 4B, 4D, 4G, 4J is located downside the windshield.

Also in a windshield of an automobile, the windshield is sometimes arranged so that three sides are covered up to make only one side (for example, top side) well visible. In such a case, the interlayer films 11B, 11D, 11G, 11J can be preferably used.

FIG. 4 is a perspective view schematically showing an interlayer film for laminated glass in accordance with a fourth embodiment of the present invention.

An interlayer film 11C shown in FIG. 4 includes a first layer 1C, a second layer 2C, a third layer 3C, and a lateral covering part 4C. In the interlayer film 11C, unlike the interlayer film 11, only two opposed lateral surfaces among the four lateral surfaces of the first layer 1C are covered with the lateral covering part 4C (the right side and the left side in FIG. 4). The lateral covering part 4C is made of a material that is different from materials of the second layer 2C and the third layer 3C. The lateral covering part 4C is formed of a resin composition that is different from those of the second layer 2C and the third layer 3C. The lateral covering part 4C is configured separately from the second layer 2C and the third layer 3C. Among the four lateral surfaces of the first layer 1C, opposed two lateral surfaces are not covered with the lateral covering part 4C and thus exposed (the front side and the back side in FIG. 4). The lateral covering part 4C does not cover the lateral parts of the second layer 2C and the third layer 3C.

FIG. 5 is a perspective view schematically showing an interlayer film for laminated glass in accordance with a fifth embodiment of the present invention.

An interlayer film 11D shown in FIG. 5 includes a first layer 1D, a second layer 2D, a third layer 3D, and a lateral covering part 4D. In the interlayer film 11D, unlike the interlayer film 11, only one lateral surface among the four lateral surfaces of the first layer 1D is covered with the lateral covering part 4D (the left side in FIG. 5). The lateral covering part 4D is made of a material that is different from materials of the second layer 2D and the third layer 3D. The lateral covering part 4D is formed of a resin composition that is different from those of the second layer 2D and the third layer 3D. The lateral covering part 4D is configured separately from the second layer 2D and the third layer 3D. Among the four lateral surfaces of the first layer 1D, three lateral surfaces are not covered with the lateral covering part 4D and thus exposed (the front side, the back side and the right side in FIG. 5). The lateral covering part 4D does not cover the lateral parts of the second layer 2D and the third layer 3D.

FIG. 6 is a perspective view schematically showing an interlayer film for laminated glass in accordance with a sixth embodiment of the present invention.

An interlayer film 11E shown in FIG. 6 includes a first layer 1E, a second layer 2E, a third layer 3E, and a lateral covering part 4E. In the interlayer film 11E, unlike the interlayer film 11, only two opposed lateral surfaces among the four lateral surfaces of the first layer 1E are covered with the lateral covering part 4E (the right side and the left side in FIG. 6). The lateral covering part 4E is made of a material that is different from materials of the second layer 2E and the third layer 3E. The lateral covering part 4E is formed of a resin composition that is different from those of the second layer 2E and the third layer 3E. The lateral covering part 4E is configured separately from the second layer 2E and the third layer 3E. Among the four lateral surfaces of the first layer 1E, opposed two lateral surfaces are not covered with the lateral covering part 4E and thus exposed (the front side and the back side in FIG. 6). The lateral covering part 4E covers also the lateral parts of the second layer 2E and the third layer 3E.

FIG. 7 is a perspective view schematically showing an interlayer film for laminated glass in accordance with a seventh embodiment of the present invention.

An interlayer film 11F shown in FIG. 7 is a multi-layered interlayer film having a two-layer structure. The interlayer film 11F has a rectangular planar shape.

The interlayer film 11F includes a first layer 1F and a second layer 2F. The interlayer film 11F includes a lateral covering part 4F.

The first layer 1F has a first principal surface and a second principal surface that are opposed to each other. The first layer 1F has a lateral part connecting the first principal surface and the second principal surface. In the present embodiment, the lateral part is planar, and is a lateral surface. The first layer 1F has four lateral surfaces.

The lateral covering part 4F covers the entire two lateral parts opposed to each other among the four lateral surfaces of the first layer 1F. To be more specific, only two opposed lateral surfaces among the four lateral surfaces of the first layer 1F are covered with the lateral covering part 4F (the right side and the left side in FIG. 7). The second layer 2F and the third layer 3F constitute the lateral covering part 4F. Among the four lateral surfaces of the first layer 1F, opposed two lateral surfaces are not covered with the lateral covering part 4F and thus exposed (the front side and the back side in FIG. 7). The second principal surface of the first layer 1F is also exposed. On the second principal surface of the first layer 1F, a lamination glass member can be layered.

FIG. 8 is a perspective view schematically showing an interlayer film for laminated glass in accordance with an eighth embodiment of the present invention.

An interlayer film 11G shown in FIG. 8 includes a first layer 1G and a second layer 2G. The interlayer film 11G includes a lateral covering part 4G. In the interlayer film 11G, unlike the interlayer film 11, only one lateral surface among the four lateral surfaces of the first layer 1G is covered with the lateral covering part 4G (the left side in FIG. 8). The second layer 2G constitutes the lateral covering part 4G. Among the four lateral surfaces of the first layer 1G, three lateral surfaces are not covered with the lateral covering part 4G and thus exposed (the front side, the back side and the right side in FIG. 8). The second principal surface of the first layer 1G is also exposed. On the second principal surface of the first layer 1G, for example, a lamination glass member can be layered.

FIG. 9 is a perspective view schematically showing an interlayer film for laminated glass in accordance with a ninth embodiment of the present invention.

An interlayer film 11H shown in FIG. 9 is a single-layered interlayer film having a one-layer structure. The interlayer film 11H has a rectangular planar shape.

The interlayer film 11H includes a first layer 1H and a lateral covering part 4H.

The first layer 1H has a first principal surface and a second principal surface that are opposed to each other. The first layer 1H has a lateral part connecting the first principal surface and the second principal surface. In the present embodiment, the lateral part is planar, and is a lateral surface. The first layer 1H has four lateral surfaces.

The lateral covering part 4H covers the entire lateral part of the first layer 1H. Specifically, the entire four lateral surfaces of the first layer 1H are covered with the lateral covering part 4H. The first principal surface and the second principal surface of the first layer 1H are also exposed. On the first principal surface and the second principal surface of the first layer 1H, for example, a lamination glass member can be layered.

FIG. 10 is a perspective view schematically showing an interlayer film for laminated glass in accordance with a tenth embodiment of the present invention.

An interlayer film 11I shown in FIG. 10 includes a first layer 1I and a lateral covering part 4I.

In the interlayer film 11I, unlike the interlayer film 11, only two opposed lateral surfaces among the four lateral surfaces of the first layer 1I are covered with the lateral covering part 4I (the right side and the left side in FIG. 10). Among the four lateral surfaces of the first layer 1I, opposed two lateral surfaces are not covered with the lateral covering part 4I and thus exposed (the front side and the back side in FIG. 10). The first principal surface and the second principal surface of the first layer 1I are also exposed. On the first principal surface and the second principal surface of the first layer 1I, for example, a lamination glass member can be layered.

FIG. 11 is a perspective view schematically showing an interlayer film for laminated glass in accordance with an eleventh embodiment of the present invention.

An interlayer film 11J shown in FIG. 11 includes a first layer 1J and a lateral covering part 4J.

In the interlayer film 11J, unlike the interlayer film 11, only one lateral surface among the four lateral surfaces of the first layer 1J is covered with the lateral covering part 4J (the left side in FIG. 11). Among the four lateral surfaces of the first layer 1J, three lateral surfaces are not covered with the lateral covering part 4J and thus exposed (the front side, the back side and the right side in FIG. 11). The first principal surface and the second principal surface of the first layer 1J are also exposed. On the first principal surface and the second principal surface of the first layer 1J, for example, a lamination glass member can be layered.

As in the embodiments described above, the lateral covering part may cover at least part of the lateral part of the first layer. When the lateral covering part covers at least part of the lateral part of the first layer, it is possible to make foaming be less likely to occur in an end part in the region where the lateral covering part exists. The larger the region where the lateral covering part exists is, the larger the region where foaming can be made less likely to occur becomes. The lateral covering part may cover the entire outer periphery of the part corresponding to the lateral part of the first layer, or may cover a part of the outer periphery of the part corresponding to the lateral part of the first layer.

When the second layer constitutes the resin covering part, the second layer may cover at least part of the lateral part of the first layer by reaching at least part of the lateral part of the first layer. When the third layer constitutes the resin covering part, the third layer may cover at least part of the lateral part of the first layer by reaching at least part of the lateral part of the first layer.

From the viewpoints of further preventing foaming in an end part, and further preventing plate slippage, in 100% of the length of one round of the lateral part which is an outer periphery of the first layer, the length of the lateral part covered with the lateral covering part is preferably 5% or more, more preferably 10% or more, still more preferably 15% or more, further preferably 20% or more, especially preferably 25% or more, and is preferably 100% or less.

From the viewpoints of further preventing foaming in an end part, and further preventing plate slippage, in 100% of the entire surface area of the lateral part of the first layer, the surface area covered with the lateral covering part is preferably 5% or more, more preferably 10% or more, still more preferably 15% or more, further preferably 20% or more, especially preferably 25% or more, and is preferably 100% or less.

When the planar shape of the interlayer film is a polygon such as a rectangle, it is preferred that a lateral part of one or more sides of the first layer be covered with the lateral covering part, and it is more preferred that a lateral part of two or more sides of the first layer be covered with the lateral covering part. From the viewpoints of further preventing foaming in an end part, and further preventing plate slippage, it is further preferred that a lateral part of three or more sides of the first layer be covered with the lateral covering part, and it is especially preferred that a lateral part of four sides of the first layer be covered with the lateral covering part.

From the viewpoints of further preventing foaming in an end part, and further preventing plate slippage, the thickness of the lateral covering part is preferably 0.05 mm or more, more preferably 0.06 mm or more, further preferably 0.07 mm or more. From the viewpoints of enhancing the sound insulating properties, preventing foaming in an end part, and enhancing the preventive effect of plate slippage in good balance, the thickness of the lateral covering part is preferably 2 mm or less, more preferably 1.8 mm or less. The thickness of the lateral covering part is determined by averaging the thicknesses of the lateral covering part on the lateral part of the first layer. Regarding the thickness of the lateral covering part, the part where the lateral covering part is not formed is not taken into account.

From the viewpoints of further preventing foaming in an end part, and further preventing plate slippage, it is preferred that the interlayer film according to the present invention include the second layer arranged on the first principal surface of the first layer.

From the viewpoints of further preventing foaming in an end part, and further preventing plate slippage, it is preferred that the first layer have a shear elastic modulus at 25° C. of 0.17 MPa or less, and the second layer have a shear elastic modulus at 25° C. of more than 1 MPa.

From the viewpoints of further preventing foaming in an end part, and further preventing plate slippage, the shear elastic modulus at 25° C. of the second layer is preferably 3 MPa or more, more preferably 5 MPa or more. The shear elastic modulus at 25° C. of the second layer may be 100 MPa or less.

From the viewpoints of further preventing foaming in an end part, and further preventing plate slippage, it is preferred that the interlayer film according to the present invention include the third layer arranged on the second principal surface of the first layer.

From the viewpoints of further preventing foaming in an end part, and further preventing plate slippage, it is preferred that the first layer have a shear elastic modulus at 25° C. of 0.17 MPa or less, and the third layer have a shear elastic modulus at 25° C. of more than 1 MPa.

From the viewpoints of further preventing foaming in an end part, and further preventing plate slippage, the shear elastic modulus at 25° C. of the third layer is preferably 3 MPa or more, more preferably 5 MPa or more. The shear elastic modulus at 25° C. of the third layer may be 100 MPa or less.

Hereinafter, the details of the first layer, the second layer, the third layer, and the lateral covering part which constitute the interlayer film according to the present invention, and the details of each ingredient contained in the first layer, the second layer, the third layer, and the lateral covering part will be described.
(Resin)

It is preferred that each of the first layer, the second layer, the third layer, and the lateral covering part contain a resin. One kind of the resin may be used alone, and two or more kinds thereof may be used in combination.

Examples of the resin include thermosetting resins and thermoplastic resins. The resin may be a cured product of a photocurable compound or a moisture-curable compound. The cured product of a photocurable compound or a moisture-curable compound can be a thermoplastic resin.

The thermoplastic resin means a resin that softens and exhibits plasticity when it is heated, and hardens when it is cooled to room temperature. Among the thermoplastic resins, especially the thermoplastic elastomer means a resin that softens and exhibits plasticity when it is heated, and hardens to exhibits rubber elasticity when it is cooled to room temperature (25° C.).

Examples of the thermoplastic resin include a polyvinyl acetal resin, a polyester resin, an aliphatic polyolefin, polystyrene, an ethylene-vinyl acetate copolymer resin, an ethylene-acrylic acid copolymer resin, a polyurethane resin, an ionomer resin, a polyvinyl alcohol resin, and a polyvinyl acetate resin. Thermoplastic resins other than these may be used. The polyoxymethylene (or polyacetal) resin is included in the polyvinyl acetal resin.

The thermoplastic resins exemplified above can be a thermoplastic elastomer by adjusting the molecular structure, the polymerization degree and the like of the resin.

The resin is preferably a thermoplastic resin, more preferably a polyvinyl acetal resin, a polyester resin or polyvinyl acetate, further preferably a polyvinyl acetal resin or a polyester resin, and the polyvinyl acetal resin is especially preferably a polyvinyl butyral resin.

It is preferred that the first layer contain a thermoplastic resin (hereinafter, sometimes described as a thermoplastic resin (1)), or contain a cured product of a photocurable compound or a moisture-curable compound (hereinafter, sometimes described as a cured product (1)). The thermoplastic resin (1) and the cured product (1) are collectively called a resin (1). The first layer may contain the thermoplastic resin (1), or may contain a cured product of a photocurable compound or a moisture-curable compound. It is preferred that the first layer contain as the thermoplastic resin (1), a polyvinyl acetal resin (hereinafter, sometimes described as a polyvinyl acetal resin (1)) or a polyester resin (hereinafter, sometimes described as a polyester resin (1)). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). It is preferred that the resin covering part contain a resin (hereinafter, sometimes described as a resin (4)), and it is preferred that the resin covering part contain a thermoplastic resin (hereinafter, sometimes described as a thermoplastic resin (4)) as the resin (4). It is preferred that the resin covering part contain a polyvinyl acetal resin (hereinafter, sometimes described as a polyvinyl acetal resin (4)), an epoxy resin (hereinafter, sometimes described as an epoxy resin (4)), a polyester resin (hereinafter, sometimes described as a polyester resin (4)), or an acryl resin (hereinafter, sometimes described as an epoxy resin (4)) as the resin (4). One kind of each of the thermoplastic resin (1), the thermoplastic resin (2), the thermoplastic resin (3), the resin (4), and the thermoplastic resin (4) may be used alone and two or more kinds thereof may be used in combination. The thermoplastic resin (1), the thermoplastic resin (2), the thermoplastic resin (3), and the thermoplastic resin (4) may be the same or different from one another.

The photocurable compound or the moisture-curable compound is preferably a curable compound having a (meth)acryloyl group, and is more preferably a (meth)acryl polymer. The resin is preferably a curable compound having a (meth)acryloyl group, and is more preferably a (meth)acryl polymer.

It is preferred that the (meth)acryl polymer be a polymer of a polymerizable composition containing a curable compound having a (meth)acryloyl group. The polymerizable composition contains a polymerizable component. In order to effectively form the cured product in the layer containing the cured product, the polymerizable composition may contain a photoreaction initiator. The polymerizable composition may contain an auxiliary for accelerating the curing reaction together with the photoreaction initiator. Representatives of the curable compound having a (meth)acryloyl group include (meth)acrylic ester. It is preferred that the (meth)acrylic polymer be a poly(meth)acrylic ester.

For effectively obtaining the effect of the present invention, it is preferred that the polymerizable component include a (meth)acrylic ester having a cyclic ether structure, a (meth)acrylic ester having an aromatic ring, a (meth)acrylic ester having a polar group, or an acyclic (meth)acrylic ester having 6 or less carbon atoms in the side chain. By using such a preferred (meth)acrylic ester, it is possible to enhance both the sound insulating properties and the ability to prevent foaming in good balance.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetane-3-yl)methyl (meth)acrylate, (3-propyloxetane-3-yl)methyl (meth)acrylate, (3-ethyloxetane-3-yl)methyl (meth)acrylate, (3-butyloxetane-3-yl)methyl (meth)acrylate, (3-ethyloxetane-3-yl)ethyl (meth)acrylate, (3-ethyloxetane-3-yl)propyl (meth)acrylate, (3-ethyloxetane-3-yl)butyl (meth)acrylate, (3-ethyloxetane-3-yl)pentyl (meth)acrylate, (3-ethyloxetane-3-yl)hexyl (meth)acrylate; tetrahydrofurfuryl (meth)acrylate, γ-butyrolactone (meth)acrylate, (2,2-dimethyl-1,3-dioxolanedioxolane-4-yl)methyl (meth)acrylate, (2-methyl-2-ethyl-1,3-dioxolane-4-yl)methyl (meth)acrylate, (2-methyl-2-isobutyl-1,3-dioxolane-4-yl)methyl (meth)acrylate, (2-cyclohexyl-1,3-dioxolane-4-yl)methyl (meth)acrylate, tetrahydrofurfuryl alcohol acrylic acid multimer ester; tetrahydro-2H-pyran-2-yl-(meth)acrylate, 2-{1-[(tetrahydro-2H-pyran-2-yl)oxy]-2-methylpropyl}(meth)acrylate, cyclic trimethylol propane formal acrylate, (meth)acryloyl morpholine and the like. From the viewpoint of effectively obtaining the effect of the present invention, tetrahydrofurfuryl (meth)acrylate, or cyclic trimethylol propane formal acrylate is especially preferred.

Examples of the (meth)acrylic ester having an aromatic ring include benzyl acrylate, phenoxypolyethyleneglycol acrylate and the like.

Examples of the (meth)acrylic ester having a polar group include (meth)acrylic esters having a hydroxyl group, an amide group, an amino group, an isocyanate group and the like as the polar group.

Examples of the (meth)acrylic ester having a hydroxyl group include 2-hydroxyethyl (meth)acrylate, hydroxypropyl (meth)acrylate and the like.

Examples of the (meth)acrylic ester having an amide group include N,N-dimethylaminopropyl (meth)acrylamide, N,N-dimethyl (meth)acrylamide, (meth)acryloyl morpholine, N-isopropyl (meth)acrylamide, N-hydroxyethyl (meth)acrylamide and the like.

Examples of the (meth)acrylic ester having an amide group or an amino group include N-dialkylaminoalkyl (meth)acrylamide, N,N-dialkylaminoalkyl (meth)acrylamide and the like.

Examples of the (meth)acrylic ester having an isocyanate group include triallylisocyanurate, derivatives thereof and the like.

The above-described (meth)acrylic ester may be a polycarboxylic ester having a (meth)acryloyl group. Examples of the polycarboxylic ester having a (meth)acryloyl group include 2-acryloyloxyethyl succinate and the like.

From the viewpoint of effectively obtaining the effect of the present invention, a (meth)acrylic ester having a hydroxyl group is preferred, and 2-hydroxyethyl (meth)acrylate, or hydroxypropyl (meth)acrylate is especially preferred.

Examples of the acyclic (meth)acrylic ester having 6 or less carbon atoms in the side chain include methyl (meth)acrylate, ethyl (meth)acrylate, propyl (meth)acrylate, butyl (meth)acrylate and the like.

For effectively obtaining the effect of the present invention, it is preferred that the blending amount of the acyclic (meth)acrylic ester having 8 or more carbon atoms in the side chain in 100% by weight of the polymerizable component be less than 20% by weight.

Examples of the (meth)acrylic ester include besides the compounds as recited above, diethyleneglycol monoethylether (meth)acrylate, isobornyl (meth)acrylate, 3-methoxybutyl (meth)acrylate, 2-acryloyloxyethyl-2-hydroxypropylphthalate, 2-acryloyloxyethyl-2-hydroxylpropylphthalate, cyclohexyl (meth)acrylate; ethylene glycol di(meth)acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth)acrylate; trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-acryloyloxyethyl)phosphate, tetramethylol methane tri(meth)acrylate, tetramethylol propane tetra(meth)acrylate, derivatives thereof and the like.

One kind of the (meth)acrylic ester may be used alone, and two or more kinds thereof may be used in combination. The above-described (meth)acryl polymer may be a homopolymer of the above-described (meth)acrylic ester, or may be a copolymer of a polymerizable component containing the above-described (meth)acrylic ester.

Concrete examples of the photoreaction initiator include 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadiene-1-yl)-bis(2,6-difluoro-3-(1H-pyrrole-1-yl)-phenyl) titanium, 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, diethoxyacetophenone, 2-hydroxy-2-methyl-1-phenylpropan-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, (4-benzoylbenzyl)trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthon-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6-trimethylbenzoyl)-phenylphosphine oxide, triphenylmethylium tetrakis(pentafluorophenyl) borate and the like. Only one kind of the photoreaction initiator may be used, and two or more kinds thereof may be used in combination.

Examples of the auxiliary include triethanolamine, triisopropanolamine, 4,4'-dimethylaminobenzophenone (Michler's ketone), 4,4'-diethylaminobenzophenone, 2-dimethylaminoethyl benzoic acid, and ethyl 4-dimethylaminobenzoate. Also, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone and the like can be recited. One kind of the auxiliary may be used alone and two or more kinds thereof may be used in combination.

It is preferred that the auxiliary be benzyldimethylketal, 1-hydroxycyclohexylphenyl ketone, benzoylisopropyl ether, 4-(2-hydroxyethoxy)-phenyl(2-hydroxy-2-propyl) ketone, 2-hydroxy-2-methyl-1-phenylpropan-1-one, or triphenylmethylium tetrakis(pentafluorophenyl) borate.

In 100% by weight of the polymerizable composition, the content of the photoreaction initiator is preferably 0.01% by weight or more, more preferably 0.1% by weight or more and is preferably 10% by weight or less, more preferably 5% by weight or less. When the content of the photoreaction initiator is in the range from the above-described lower limit to the above-described upper limit, the photocurability and the storage stability further increase.

It is preferred that the polyvinyl acetate be a polymer of a polymerizable composition containing vinyl acetate and a monomer having the above-described functional group because excellent effect of the present invention is achieved.

Examples of the monomer having the above-described functional group include 3-methyl-3-butyl 1-ol, ethylene glycol monovinyl ether, isopropylacrylamide and the like.

From the viewpoint of effectively enhancing the sound insulating properties, the weight average molecular weight of the polyvinyl acetate is preferably 250000 or more, more preferably 300000 or more, further preferably 400000 or more, especially preferably 500000 or more. From the viewpoint of enhancing the interlayer adhesion, the weight average molecular weight of the polyvinyl acetate is preferably 1200000 or less, more preferably 900000 or less.

The weight average molecular weight refers to a weight average molecular weight, calculated on the polystyrene equivalent basis, measured by gel permeation chromatography (GPC).

The method for polymerizing the polymerizable composition to synthesize the polyvinyl acetate is not particularly limited. Examples of the synthesizing method include a solution polymerization, suspension polymerization, UV polymerization and the like.

From the viewpoint of increasing the transparency of the interlayer film, and effectively enhancing the sound insulating properties and the interlayer adhesion in the interlayer film having increased transparency, the synthesizing method of the polyvinyl acetate is preferably solution polymerization.

For example, the polyvinyl acetal resin can be obtained by acetalizing polyvinyl alcohol (PVA) with an aldehyde. It is preferred that the polyvinyl acetal resin be an acetalized product of polyvinyl alcohol. The polyvinyl alcohol can be obtained, for example, by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less, further preferably 3500 or less. When the average polymerization degree is the above-described lower limit or more, the penetration resistance of laminated glass is further enhanced. When the average polymerization degree is the above-described upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (hydroxyl group amount) of the polyvinyl acetal resin (1) is preferably 17% by mole or more, more preferably 20% by mole or more, further preferably 22% by mole or more. The content of the hydroxyl group (the amount of hydroxyl groups) of the polyvinyl acetal resin (1) is preferably 30% by mole or less, more preferably 28% by mole or less, still more preferably 27% by mole or less, further preferably 25% by mole or less, especially preferably less than 25% by mole, most preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, when being 30% by mole or less, the sound insulating properties of laminated glass are further enhanced, and when being 28% by mole or less, the sound insulating properties are further enhanced. Moreover, when the content of the hydroxyl group is the above-described upper limit or less, the flexibility of the interlayer film is enhanced and the handling of the interlayer film is facilitated.

The content of the hydroxyl group of each of the polyvinyl acetal resin (2), the polyvinyl acetal resin (3) and the polyvinyl acetal resin (4) is preferably 25% by mole or more, more preferably 28% by mole or more, still more preferably 30% by mole or more, further preferably more than 31% by mole. Each of the contents of the hydroxyl group of the polyvinyl acetal resin (2) and the polyvinyl acetal resin (3) is further preferably 31.5% by mole or more, further preferably 32% by mole or more, especially preferably 33% by mole or more. Each of the contents of the hydroxyl group of the polyvinyl acetal resin (2) and the polyvinyl acetal resin (3) is preferably 37% by mole or less, more preferably 36.5% by mole or less, further preferably 36% by mole or less. When the content of the hydroxyl group is the above-described lower limit or more, the adhesive force of the interlayer film is further enhanced. Moreover, when the content of the hydroxyl group is the above-described upper limit or less, the flexibility of the interlayer film is enhanced and the handling of the interlayer film is facilitated.

From the viewpoint of further enhancing the sound insulating properties, it is preferred that the content of the hydroxyl group of the polyvinyl acetal resin (1) be lower than the content of the hydroxyl group of the polyvinyl acetal resin (2). From the viewpoint of further enhancing the sound insulating properties, it is preferred that the content of the hydroxyl group of the polyvinyl acetal resin (1) be lower than the content of the hydroxyl group of the polyvinyl acetal resin (3). It is preferred that the content of the hydroxyl group of the polyvinyl acetal resin (1) be lower than the content of the hydroxyl group of the polyvinyl acetal resin (4). From the viewpoint of still further enhancing the sound insulating properties, the absolute value of a difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (3) is preferably 1% by mole or more, more preferably 5% by mole or more, further preferably 9% by mole or more, especially preferably 10% by mole or more, most preferably 12% by mole or more. From the viewpoint of still further enhancing the sound insulating properties, the absolute value of a difference between the content of the hydroxyl group of the polyvinyl acetal resin (1) and the content of the hydroxyl group of the polyvinyl acetal resin (4) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (2) is preferably 20% by mole or less. An absolute value of difference between the content of the hydroxyl group of the polyvinyl acetal resin (1) and the content of the hydroxyl group of the polyvinyl acetal resin (3) is preferably 20% by mole or less. An absolute value of difference between the content of the hydroxyl group of the polyvinyl acetal resin (1) and the content of the hydroxyl group of the polyvinyl acetal resin (4) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above-described lower limit or more, the compatibility between the polyvinyl acetal resin and a plasticizer is enhanced. When the acetylation degree is the above-described upper limit or less, with regard to the interlayer film and laminated glass, the moisture resistance thereof is enhanced. In particular, when the acetylation degree of the polyvinyl acetal resin (1) is 0.1% by mole or more and is 25% by mole or less, the resulting laminated glass is more excellent in penetration resistance.

The acetylation degree of each of the polyvinyl acetal resin (2), the polyvinyl acetal resin (3), and the polyvinyl acetal resin (4) is preferably 0.01% by mole or more, more preferably 0.5% by mole or more and is preferably 10% by mole or less, more preferably 2% by mole or less. When the acetylation degree is the above-described lower limit or more, the compatibility between the polyvinyl acetal resin and a plasticizer is enhanced. When the acetylation degree is the above-described upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more and is preferably 85% by mole or less, more preferably 80% by mole or less, further preferably 75% by mole or less. When the acetalization degree is the above-described lower limit or more, the compatibility between the polyvinyl acetal resin and a plasticizer is enhanced. When the acetalization degree is the above-described upper limit or less, the reaction time required for producing the polyvinyl acetal resin is shortened.

The acetalization degree of each of the polyvinyl acetal resin (2), the polyvinyl acetal resin (3) and the polyvinyl acetal resin (4) (the butyralization degree in the case of a polyvinyl butyral resin) is preferably 55% by mole or more, more preferably 60% by mole or more and is preferably 75% by mole or less, more preferably 71% by mole or less. When the acetalization degree is the above-described lower limit or more, the compatibility between the polyvinyl acetal resin and a plasticizer is enhanced. When the acetalization degree is the above-described upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bounded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

The polyester resin can be produced by a commonly known method for producing polyester. The polyester resin can be produced, for example, by a method of obtaining polyester by condensation reaction between a polybasic acid and a polyhydric alcohol, a method of obtaining polyester by transesterification between an alkyl ester of polybasic acid and a polyhydric alcohol, or a method of obtaining polyester by further polymerizing the polyester obtained by the above-described method in the presence of a polymerization catalyst.

Examples of the polybasic acid include aromatic dicarboxylic acids such as terephthalic acid, isophthalic acid, orthophthalic acid, and naphthalene dicarboxylic acid; aliphatic dicarboxylic acids such as succinic acid, glutaric acid, adipic acid, azelaic acid, sebacic acid, dodecanedioic acid, and dimer acid; unsaturated dicarboxylic acids such as (anhydrous) maleic acid, fumaric acid, dodecenylsuccinic anhydride, and terpene-maleic acid adduct; alicyclic dicarboxylic acids such as 1,4-cyclohexanedicarboxylic acid, tetrahydrophthalic acid, hexahydroisophthalic acid, and 1,2-cyclohexenedicarboxylic acid; tri- or higher valent carboxylic acids such as (anhydrous) trimellitic acid, (anhydrous) pyromellitic acid, and methylcyclohexene tricarboxylic acid; monocarboxylic acids such as 4,4-bis(4'-hydroxyphenyl)-pentanoic acid, 4-mono(4'-hydroxyphenyl-pentanoic acid, and p-hydroxybenzoic acid, and the like.

Examples of the polyhydric alcohols include aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9-nonanediol; ether glycols such as diethylene glycol, triethylene glycol, polyethylene glycol, polypropylene glycol, and polytetramethylene glycol; alicyclic polyalcohols such as 1,4-cyclohexane dimethanol, 1,3-cyclohexane dimethanol, 1,2-cyclohexane dimethanol, tricyclodecane glycol, and hydrated bisphenol; tri- or more valent polyalcohols such as trimethylolpropane, trimethylolethane, and pentaerythritol, and the like.

As a commercially available product of the above-described polyester resin, for example, "elitel UE-3220" available from UNITIKA LTD. and "elitel UE-3223" available from UNITIKA LTD. can be recited.

The resin covering part may contain rubber in place of the above-described resin. Examples of the rubber include natural rubber, chloroprene acrylic rubber, nitrobutadiene rubber, butyl rubber, silicone rubber, ethylene propylene rubber, fluorine rubber, and the like. In the present specification, rubbers such as natural rubber and synthetic rubber are also included in the resin.

(Plasticizer)

It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). It is preferred that the lateral covering part contain a plasticizer (hereinafter, sometimes described as a plasticizer (4)). By the use of the plasticizer, and further by using a polyvinyl acetal resin and a plasticizer together, the adhesive force of a layer containing the polyvinyl acetal resin and the plasticizer to a lamination glass member or another layer is moderately enhanced. The plasticizer is not particularly limited. The plasticizer (1), the plasticizer (2), the plasticizer (3) and the plasticizer (4) may be the same as or different from one another. One kind of each of the plasticizer (1), the plasticizer (2), the plasticizer (3) and the plasticizer (4) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, and decylic acid, and benzoic acid and the like.

Examples of the polybasic organic acid ester include ester compounds of a polybasic organic acid and an alcohol having a linear or branched structure of 4 to 8 carbon atoms and the like. Examples of the polybasic organic acid include phthalic acid, adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dibutyl maleate, bis(2-butoxyethyl) adipate, dibutyl adipate, diisobutyl adipate, 2,2-butoxyethoxyethyl adipate, benzoic acid glycol ester, adipic acid 1,3-butyleneglycol polyester, dihexyl adipate, dioctyl adipate, hexyl cyclohexyl adipate, a mixture of heptyl adipate and nonyl adipate, diisononyl adipate, diisodecyl adipate, heptyl nonyl adipate, tributyl citrate, tributyl acetylcitrate, diethyl carbonate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, tricresyl phosphate, triisopropyl phosphate, and the like.

It is preferred that the plasticizer be a diester plasticizer represented by the following formula (11).

[Chemical 1]

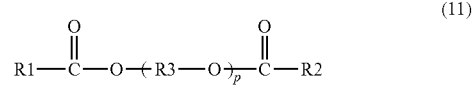

(11)

In the foregoing formula (11), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (11) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2- ethylbutyrate (3GH) or triethylene glycol di-2-ethylpropanoate. It is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the first layer, the content of the plasticizer (1) relative to 100 parts by weight of the resin (1) is referred to as content (1). When the resin (1) is the thermoplastic resin (1), 100 parts by weight of the resin (1) is 100 parts by weight of the thermoplastic resin (1). When the resin (1) is the polyvinyl acetal resin (1), 100 parts by weight of the resin (1) is 100 parts by weight of the polyvinyl acetal resin (1). When the resin (1) is the polyester resin (1), 100 parts by weight of the resin (1) is 100 parts by weight of the polyester resin (1). The same applies to other resins. The content (1) is preferably 50 parts by weight or more, more preferably 55 parts by weight or more, further preferably 60 parts by weight or more, and is preferably 130 parts by weight or less, more preferably 100 parts by weight or less, further preferably 90 parts by weight or less, especially preferably 85 parts by weight or less, most preferably 80 parts by weight or less. When the content (1) is the above-described lower limit or more, the flexibility of the interlayer film is enhanced and the handling of the interlayer film is facilitated. When the content (1) is the above upper limit or less, the penetration resistance of laminated glass is further enhanced.

In the second layer, the content of the plasticizer (2) relative to 100 parts by weight of the thermoplastic resin (2) is referred to as content (2). When the thermoplastic resin (2) is the polyvinyl acetal resin (2) in the third layer, 100 parts by weight of the thermoplastic resin (2) is 100 parts by weight of the polyvinyl acetal resin (2). When the thermoplastic resin (2) is the polyester resin (2), 100 parts by weight of the thermoplastic resin (2) is 100 parts by weight of the polyester resin (2). The same basis applies to other resins. In the third layer, the content of the plasticizer (3) relative to 100 parts by weight of the thermoplastic resin (3) is referred to as content (3). When the thermoplastic resin (3) is the polyvinyl acetal resin (3), 100 parts by weight of the thermoplastic resin (3) is 100 parts by weight of the polyvinyl acetal resin (3). When the thermoplastic resin (3) is the polyester resin (3), 100 parts by weight of the thermoplastic resin (3) is 100 parts by weight of the polyester resin (3). The same basis applies to other resins. In the lateral covering part, the content of the plasticizer (4) relative to 100 parts by weight of the resin (4) is referred to as a content (4). When the resin (4) is the thermoplastic resin (4), 100 parts by weight of the resin (4) is 100 parts by weight of the thermoplastic resin. When the thermoplastic resin (4) is the polyvinyl acetal resin (4), 100 parts by weight of the thermoplastic resin (4) is 100 parts by weight of the polyvinyl acetal resin (4). When the thermoplastic resin (4) is the polyester resin (4), 100 parts by weight of the thermoplastic resin (4) is 100 parts by weight of the polyester resin (4). The same basis applies to other resins. Each of the content (2), the content (3) and the content (4) is preferably 10 parts by weight or more, more preferably 15 parts by weight or more, and is preferably 40 parts by weight or less, more preferably 39 parts by weight or less, further preferably 35 parts by weight or less, further preferably 32 parts by weight or less, especially preferably 30 parts by weight or less. When the content (2), the content (3) and the content (4) are the above lower limit or more, the flexibility of the interlayer film is enhanced and the handling of the interlayer film is facilitated. When the content (2), the content (3) and the content (4) are the above upper limit or less, the penetration resistance is further enhanced.

For the purpose of further enhancing the sound insulating properties of laminated glass, it is preferred that the content (1) be larger than the content (2), it is preferred that the content (1) be larger than the content (3), and it is preferred that the content (1) be larger than the content (4).

From the viewpoint of further enhancing the sound insulating properties of laminated glass, each of the absolute value of difference between the content (2) and the content (1), the absolute value of difference between the content (3) and the content (1) and the absolute value of difference between the content (4) and the content (1) is preferably 10 parts by weight or more, more preferably 15 parts by weight or more, further preferably 20 parts by weight or more. Each of the absolute value of difference between the content (2) and the content (1), the absolute value of difference between the content (3) and the content (1) and the absolute value of difference between the content (4) and the content (1) is preferably 80 parts by weight or less, more preferably 75 parts by weight or less, further preferably 70 parts by weight or less.

(Compound Having Softening Point of 70° C. or More and 200° C. or Less)

From the viewpoint of effectively enhancing the sound insulating properties, it is preferred that the first layer contain a compound having a softening point of 70° C. or more and 200° C. or less (hereinafter, sometimes described as compound (A)). It is considered that by using the compound (A), the molecular motion increase in the vicinity of the glass transition temperature in the first layer, so that the sound insulating properties are enhanced. One kind of the compound (A) may be used alone, and two or more kinds thereof may be used in combination.

From the viewpoint of effectively enhancing the sound insulating properties, the softening point of the compound (A) is preferably 80° C. or more, and is preferably 190° C. or less.

When the compound (A) is a compound not having a softening point, it is preferred that the first layer contain a compound having a melting point of 70° C. or more and 200° C. or less from the viewpoint of effectively enhancing the sound insulating properties.

It is preferred that the compound (A) be a compound that is different from the thermoplastic resin. It is preferred that the compound (A) be a compound that is different from the polyvinyl acetal resin.

Concrete examples of the compound (A) include ester compounds having a plurality of aromatic rings; ether compounds having a plurality of aromatic rings; tackifiers such as a rosin resin, a terpene resin and a petroleum resin; chlorinated paraffin, and the like.

As a commercially available product of the compound (A), KE-311 (available from Arakawa Chemical Industries, Ltd., having a softening point of 95° C.), EMPARA 70 (available from Ajinomoto Fine-Techno Co., Inc., having a softening point of 100° C.) and the like can be recited.

In 100% by weight of the first layer, the content of the compound (A) is preferably 20% by weight or more, more preferably 30% by weight or more and is preferably 50% by weight or less, more preferably 40% by weight or less. The content of the compound (A) relative to 100 parts by weight of the thermoplastic resin (1) (100 parts by weight of the polyvinyl acetal resin (1) when the thermoplastic resin (1) is the polyvinyl acetal resin (1)) is preferably 50 parts by weight or more, more preferably 60 parts by weight or more, and is preferably 200 parts by weight or less, more preferably 150 parts by weight or less. When the content of the compound (A) is the above-described lower limit or more, the sound insulating properties are effectively enhanced. When the content of the compound (A) is the above-described upper limit or less, the formability is further improved.

(Heat Shielding Substance)

The interlayer film may contain a heat shielding substance (heat shielding compound). The first layer may contain a heat shielding substance. The second layer may contain a heat shielding substance. The third layer may contain a heat shielding substance. The lateral covering part may contain a heat shielding substance. One kind of the heat shielding substance may be used alone, and two or more kinds thereof may be used in combination.

Ingredient X:

The interlayer film may contain at least one kind of Ingredient X among a phthalocyanine compound, a naphthalocyanine compound and an anthracyanine compound. The first layer may contain the Ingredient X. The second layer may contain the Ingredient X. The third layer may contain the Ingredient X. The lateral covering part may contain the Ingredient X. The Ingredient X is a heat shielding substance. One kind of the Ingredient X may be used alone, and two or more kinds thereof may be used in combination.

The Ingredient X is not particularly limited. Examples of the Ingredient X that can be used include a phthalocyanine compound, a naphthalocyanine compound and an anthracyanine compound that are conventionally known.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a region containing the Ingredient X (a first layer, a second layer, a third layer, or a lateral covering part), the content of the Ingredient X is preferably 0.001% by weight or more, more preferably 0.005% by weight or more, further preferably 0.01% by weight or more, especially preferably 0.02% by weight or more. In 100% by weight of a region containing the Ingredient X (a first layer, a second layer, a third layer, or a lateral covering part), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding properties are sufficiently enhanced and the visible light transmittance is sufficiently enhanced. For example, it is possible to make the visible light transmittance 70% or more.

Heat Shielding Particles:

The interlayer film may contain heat shielding particles. The first layer may contain heat shielding particles. The second layer may contain heat shielding particles. The third layer may contain heat shielding particles. The lateral covering part may contain the heat shielding particles. The heat shielding particles are of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particles be particles (metal oxide particles) formed of an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, and is preferably 0.1 µm or less, more preferably 0.05 µm or less. When the average particle diameter is the above lower limit or more, the heat ray shielding properties are sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.) or the like.

In 100% by weight of a region containing the heat shielding particles (a first layer, a second layer, a third layer, or a lateral covering part), the content of the heat shielding particles is preferably 0.01% by weight or more, more preferably 0.1% by weight or more, further preferably 1% by weight or more, especially preferably 1.5% by weight or more. In 100% by weight of a region containing the heat shielding particles (a first layer, a second layer, a third layer, or a lateral covering part), the content of the heat shielding particles is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding properties are sufficiently enhanced and the visible light transmittance is sufficiently enhanced.

(Metal Salt)

The interlayer film may contain at least one kind of metal salt (hereinafter, sometimes described as Metal salt M) among an alkali metal salt, an alkaline earth metal salt, and a Mg salt. The first layer may contain the Metal salt M. The second layer may contain the metal salt M. The third layer may contain the Metal salt M. The lateral covering part may contain the metal salt M. It is preferred that the surface layer contain the metal salt M. By the use of the Metal salt M, controlling the adhesivity between the interlayer film and a lamination glass member or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a Mg salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a region containing the metal salt M (a first layer, a second layer, a third layer, or a lateral covering part) is preferably 5 ppm or more, more preferably 10 ppm or more, further preferably 20 ppm or more, preferably 300 ppm or less, more preferably 250 ppm or less, further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

The interlayer film may contain an ultraviolet ray screening agent. The first layer may contain an ultraviolet ray screening agent. The second layer may contain an ultraviolet ray screening agent. The third layer may contain an ultraviolet ray screening agent. The lateral covering part may contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent be not heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolysable organosilicon compound, a silicone compound, and the like.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.) and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.) and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include oxalic diamides having a substituted aryl group or the like on the nitrogen atom, such as N-(2-ethylphenyl)-N-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.) and the like.

In 100% by weight of a region containing the ultraviolet ray screening agent (a first layer, a second layer, a third layer, or a lateral covering part), the content of the ultraviolet ray screening agent is preferably 0.1% by weight or more, more preferably 0.2% by weight or more, further preferably 0.3% by weight or more, especially preferably 0.5% by weight or more. In 100% by weight of a region containing the ultraviolet ray screening agent (a first layer, a second layer, a third layer, or a lateral covering part), the content of the ultraviolet ray screening agent is preferably 2.5% by weight or less, more preferably 2% by weight or less, further preferably 1% by weight or less, especially preferably 0.8% by weight or less. When the content of the ultraviolet ray screening agent is the above-described lower limit or more and the above-described upper limit or less, deterioration in visible light transmittance after a lapse of a period can be further suppressed. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

The interlayer film may contain an oxidation inhibitor. The first layer may contain an oxidation inhibitor. The second layer may contain an oxidation inhibitor. The third layer may contain an oxidation inhibitor. The lateral covering part may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy) (2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

In order to maintain high visible light transmittance of the interlayer film and laminated glass over a long period of time, it is preferred that the content of the oxidation inhibitor be 0.1% by weight or more in 100% by weight of the interlayer film or in 100% by weight of a region containing the oxidation inhibitor (a first layer, a second layer, a third layer, or a lateral covering part). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, the third layer and the lateral covering part may contain additives such as a coupling agent containing silicon, aluminum or titanium, a dispersing agent, a surfactant, a flame retardant, an antistatic agent, a pigment, a dye, a moisture-resistance improving agent, a cross-linking agent, a fluorescent brightening agent and an infrared ray absorber, as necessary. One kind of these additives may be used alone, and two or more kinds thereof may be used in combination.

(Other Details of Interlayer Film for Laminated Glass)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a longitudinal direction and a width direction, the distance between one end and the other end is a distance in the longitudinal direction of the interlayer film. When the interlayer film has a square planar shape, the distance between one end and the other end is a distance between one end and the other end that are opposed to each other.

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 2 mm or less, further preferably 1.5 mm or less. When the thickness of the interlayer film is the above lower limit or more, the penetration resistance and flexural rigidity of laminated glass are enhanced. When the thickness of the interlayer film is the above-described upper limit or less, the transparency of the interlayer film is further improved.

The thickness of the interlayer film is designated as T. The thickness of the first layer is preferably 0.06T or more, more preferably 0.0625T or more, further preferably 0.1T or more and is preferably 0.4T or less, more preferably 0.375T or less, further preferably 0.25T or less, further preferably 0.15T or less. When the thickness of the first layer is 0.4T or less, the flexural rigidity is further improved. When the thickness of the first layer is the above lower limit or more, the sound insulating properties are further enhanced.

The thickness of each of the second layer and the third layer is preferably 0.3T or more, more preferably 0.3125T or more, further preferably 0.375T or more and is preferably 0.9375T or less, more preferably 0.9T or less. The thickness of each of the second layer and the third layer may be 0.46875T or less, and may be 0.45T or less. When the thickness of each of the second layer and the third layer is the above-described lower limit or more and the above-described upper limit or less, the rigidity and the sound insulating properties of the laminated glass are further enhanced.

The total thickness of the second layer and the third layer is preferably 0.625T or more, more preferably 0.75T or more, further preferably 0.85T or more and is preferably 0.9375T or less, more preferably 0.9T or less. When the total thickness of the second layer and the third layer is the above-described lower limit or more and the above-described upper limit or less, the rigidity and the sound insulating properties of the laminated glass are further enhanced.

The interlayer film may be an interlayer film having a uniform thickness, or may be an interlayer film having varying thickness. The sectional shape of the interlayer film may be a rectangular shape and may be a wedge-like shape.

The production method of the interlayer film according to the present invention is not particularly limited. Examples of the production method of the interlayer film according to the present invention include a method of separately forming resin compositions used for constituting respective layers into respective layers, and then layering the obtained layers, a method of coextruding resin compositions used for constituting respective layers with an extruder and layering the layers, and the like. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method. The emboss roll method is preferred because a large number of embosses of the protrusions and recesses, which is a quantitatively constant protrusion and recess pattern, can be formed.

(Laminated Glass)

FIG. 12 is a sectional view schematically showing laminated glass in accordance with a first embodiment.

Laminated glass 31 shown in FIG. 12 includes a first lamination glass member 21, a second lamination glass member 22 and the interlayer film 11. In the laminated glass 31, the interlayer film 11 shown in FIG. 1 is used. The interlayer film 11 is arranged between the first lamination glass member 21 and the second lamination glass member 22 to be sandwiched therebetween.

The first lamination glass member 21 is layered on a first surface (first principal surface) of the interlayer film 11. The second lamination glass member 22 is layered on a second surface (second principal surface) opposite to the first surface of the interlayer film 11. The first lamination glass member 21 is layered on an outer surface of the first layer 1. The second lamination glass member 22 is layered on an outer surface of the third layer 3.

In the laminated glass 31, the outer surface of the lateral covering part 4, and the lateral surfaces of the laminated glass constituting member 21 and the laminated glass constituting member 22 are contiguous. In the laminated glass 31, the first layer 1 is covered with the lateral covering part 4 so that the first layer 1 is not exposed.

FIG. 13 is a sectional view schematically showing laminated glass in accordance with a second embodiment.

Laminated glass 31X shown in FIG. 13 includes a first lamination glass member 21X, a second lamination glass member 22X and an interlayer film 11X. The interlayer film 11X includes a first layer 1X and a metal covering part 4X.

The first lamination glass member 21X is layered on a first surface (first principal surface) of the interlayer film 11X. The second lamination glass member 22X is layered on a second surface (second principal surface) opposite to the first surface of the interlayer film 11.

In the laminated glass 31X, the lateral covering part 4X reaches on the lateral surfaces of the lamination glass constituting member 21X and the lamination glass constituting member 22X. In the laminated glass 31X, the first layer 1X is covered with the lateral covering part 4X so that the first layer 1 is not exposed. In the laminated glass 31X, the lateral surfaces of the laminated glass constituting member 21X and the laminated glass constituting member 22X are covered with the lateral covering part 4X, so that the lateral surfaces of the laminated glass constituting member 21X and the laminated glass constituting member 22X are not exposed.

As in the laminated glass 31, the lateral covering part of the interlayer film may reach on at least part of lateral parts of the first lamination glass member and the second lamination glass member. The lateral covering part of the interlayer film may not reach the lateral parts of the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is preferred that both of the first lamination glass member and the second lamination glass member be glass plates (a first glass plate and a second glass plate). The interlayer film is arranged between a first glass plate and a second glass plate to suitably obtain laminated glass.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less, more preferably 3 mm or less. Moreover, when the lamination glass member is a glass plate, the thickness of the glass plate is preferably 0.5 mm or more, more preferably 0.7 mm or more, preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70 to 110° C. to obtain a preliminarily press-bonded laminate. Next, by putting the preliminarily press-bonded laminate into an autoclave or by pressing the laminate, the laminate is press-bonded at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings, and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass, or roof glass of an automobile, and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

The following materials were prepared.
(Resin)
Polyvinyl Acetal Resin:

Polyvinyl acetal resins shown in the following Table 1 were used. In all polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

Polyester Resin:
PEs1 (UE3220, available from UNITIKA LTD.)
PEs2 (UE3223, available from UNITIKA LTD.)
(Meth)Acryl Polymer:
Meth(Acryl) Polymers Ac1, Ac2, Ac3, and Ac4 Obtained by the Following Synthesizing Method A polymerizable composition having the blending composition shown in the following Table 3 was sandwiched between two PET sheets treated to have a mold releasability on one side (available from NIPPA, having a thickness of 50 μm) to form a polymerizable composition layer having a thickness of 100 μm. A spacer was arranged around the two PET sheets. The polymerizable composition layer was irradiated with ultraviolet rays at a dose of 3000 mJ/cm$^2$ with a high pressure mercury UV lamp to cure the polymerizable composition by reaction, and thus meth(acryl) polymers Ac1, Ac2, Ac3, Ac4 and Ac5 were obtained.

Polyvinyl Acetate:
Polyvinyl Acetate PVAc1 Obtained by the Following Synthesizing Method A glass polymerization vessel equipped with a reflux condenser, a dropping funnel, a thermometer, and a nitrogen inlet was prepared. This polymerization vessel was charged with 100 parts by weight of vinyl acetate monomer, 1.0 part by weight of 3-methyl-3-butyl-1-ol, and 3.8 parts by weight of methanol, and heated and stirred, and the interior of the polymerization vessel was replaced by nitrogen. Then the inner temperature of the polymerization vessel was controlled to 60° C., and 0.02 parts by weight of tert-butylperoxy neodecanate which is a polymerization initiator, 150 parts by weight of vinyl acetate monomer, and 1.5 parts by weight of 3-methyl-3-butyl-1-ol were dropped over 4 hours, and polymerized for 2 hours after end of the dropping, and thus a solution containing polyvinyl acetate was obtained.

The solution was dried for 3 hours in an oven at 110° C. to obtain polyvinyl acetate PVAc1.
(Plasticizer)
  Triethylene glycol di-2-ethylhexanoate (3GO)
  Benzoic acid-based plasticizer (PB-3A, available from DIC Corporation) (P1)
  Di-(2-butoxyethyl)adipate (DBEA)
  Bis(2-butoxyethyl) adipate (D931)
(Compound (A))
  Compound (A1) (KE-311, available from Arakawa Chemical Industries, Ltd., having a softening point of 95° C.)
  Compound (A2) (EMPARA 70, available from Ajinomoto Fine-Techno Co., Inc., having a softening point of 100° C.)
(Ultraviolet Ray Screening Agent)
  Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
  BHT (2,6-di-t-butyl-p-cresol)
(Metal Salt)
  Mg mixture (50:50 (weight ratio) mixture of magnesium 2-ethylbutyrate and magnesium acetate)

Example 1

Preparation of Composition for Forming First Layer:
  One hundred parts by weight of a polyvinyl acetal resin of a kind shown in the following Table 1, 75 parts by weight of a plasticizer (3GO), 100 parts by weight of compound (A1) (KE-311), 0.2 parts by weight of an ultraviolet ray screening agent (Tinuvin 326) and 0.2 parts by weight of an oxidation inhibitor (BHT) were mixed to obtain a composition for forming a first layer.
Preparation of Composition for Forming Second Layer and Third Layer (Including Lateral Covering Part):
  One hundred parts by weight of a polyvinyl acetal resin of a kind shown in the following Table 1, 35 parts by weight of a plasticizer (3GO), 0.2 parts by weight of an ultraviolet ray screening agent (Tinuvin 326), 0.2 parts by weight of an oxidation inhibitor (BHT) and a Mg mixture which gives a metal element concentration (Mg concentration) in the obtainable interlayer film of 70 ppm were mixed to obtain a composition for forming a second layer and a third layer.
Preparation of Interlayer Film:
  By coextruding the composition for forming a first layer and the composition for forming a second layer and a third layer using a coextruder, an interlayer film (780 µm in thickness) having a layered structure with a stack of a second layer (340 µm in thickness)/a first layer (100 µm in thickness)/a third layer (340 µm in thickness) was prepared.
  At the time of extrusion molding, the second layer was caused to reach the center of the lateral surface of the first layer, and the third layer was caused to reach the center of the lateral surface of the first layer, and thus the lateral covering part was constituted of the second layer and the third layer. In the obtained interlayer film, the entire lateral surface of the first layer was covered with the lateral covering part.
Preparation of Laminated Glass a (for Measuring Sound Insulating Properties):
  The center part of the obtained interlayer film was cut into a size of 6.5 cm long×6.5 cm wide. Next, the interlayer film was sandwiched between two sheets of green glass conforming to JIS R3208 (6.5 cm long×6.5 cm wide×2 mm thick) to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass A.
Preparation of Laminated Glass B (for Evaluating Foaming in End Part):
  The obtained interlayer film was cut into a size of 10 cm long×10 cm wide. In the case of an interlayer film having a lateral covering part, the interlayer film was cut so that the lateral covering part exists in an end part of at least one side. Next, the interlayer film was sandwiched between two sheets of washed and dried clear float glass (10 cm long×10 cm wide×2.5 mm thick) to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass B.
Preparation of Laminated Glass C (for Evaluating Plate Slippage):
  The obtained interlayer film was cut into a size of 30 cm long×15 cm wide. In the case of an interlayer film having a lateral covering part, the interlayer film was cut so that the lateral covering part exists in an end part of the widthwise side. Next, the interlayer film was sandwiched between two sheets of washed and dried clear float glass (30 cm long×15 cm wide×3.0 mm thick) to obtain a laminate. The laminate was put into a rubber bag and the inside thereof was degassed for 20 minutes at a degree of vacuum of 2.6 kPa, after which the laminate was transferred into an oven while keeping the laminate degassed, and furthermore, held in place at 90° C. for 30 minutes and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a sheet of laminated glass C.

Examples 2 to 12

An interlayer film and laminated glass were obtained in the same manner as that in Example 1 except that the kinds of the thermoplastic resin and the plasticizer to be blended and the blending amounts thereof for the composition for forming a first layer and the composition for forming a second layer and a third layer were set to those listed in the following Tables 1, 2. In Examples 2 to 12 and later-described Comparative Examples 1, 2, the same kinds of the ultraviolet ray screening agent and the oxidation inhibitor as those used in Example 1 were blended in the same blending amount as that in Example 1 (0.2 parts by weight relative to 100 parts by weight of the polyvinyl acetal resin), and the Mg mixture of the same kind as that in Example 1 was blended in the same blending amount as in Example 1 (the amount that gives a metal element concentration (Mg concentration) of 70 ppm in the interlayer film).

In Example 7, each of the compound (A1) and the compound (A2) was used in 60 parts by weight relative to 100 parts by weight of the thermoplastic resin.

Comparative Example 1

An interlayer film and laminated glass were obtained in the same manner as that in Example 1 except that the lateral part of the first layer was not covered with the second and the third layers.

Comparative Example 2

An interlayer film and laminated glass were obtained in the same manner as that in Example 3 except that the lateral part of the first layer was not covered with the second and the third layers.

Example 13

Preparation of First Layer:
The (meth)acryl polymer Ac1 obtained in the above (layer containing a cured product, having a thickness of 100 μm) was prepared.
Preparation of Second Layer and Third Layer:
Preparation of Composition for Forming Second Layer and Third Layer:
The following ingredients were mixed, and kneaded sufficiently with a mixing roll to obtain a composition for forming a second layer and a third layer.
Polyvinyl acetal resin (PVB) 100 parts by weight
Plasticizer (3GO) 35 parts by weight
Metal salt M (Mg mixture) in such an amount that Mg is 70 ppm in the obtained second layer and third layer
Ultraviolet ray screening agent (Tinuvin 326) in an amount of 0.2% by weight in the obtained second layer and third layer
Oxidation inhibitor (BHT) in an amount of 0.2% by weight in the obtained second layer and third layer
The composition for forming the second layer and the third layer was extruded with an extruder to obtain a second layer and the third layer (each having a thickness of 380 μm).
Preparation of Interlayer Film:
The second layer and the third layer were layered outside the first layer. An interlayer film having a structure of the second layer/the first layer/the third layer was obtained by laminating with a roll laminator ("GDRB316 A3" available from ACCO BRANDS JAPAN) at 100° C. and a speed setting 3.
At the time of lamination, the second layer was caused to reach the center of the lateral surface of the first layer, and the third layer was caused to reach the center of the lateral surface of the first layer, and thus the lateral covering part was constituted of the second layer and the third layer. In the obtained interlayer film, the entire lateral surface of the first layer was covered with the lateral covering part.
Preparation of Laminated Glass:
Laminated glass was obtained in the same manner as that in Example 1 except that the obtained interlayer film was used.

Examples 14 to 16

An interlayer film and laminated glass were obtained in the same manner as that in Example 13 except that the kinds and the amounts of the ingredients were set to that shown in the following Table 4. In Examples 14 to 16, the same kinds of the ultraviolet ray screening agent and the oxidation inhibitor as those used in Example 13 were blended in the same blending amounts as those in Example 13 (blending amounts in the second layer and in the third layer), and the Mg mixture of the same kind as that in Example 13 was blended in the same blending amount as that in Example 13 (blending amounts in the second layer and the third layer).

Example 17

Preparation of Composition for Forming First Layer:
The following ingredients were mixed, and kneaded sufficiently with a mixing roll to obtain a composition for forming a first layer.
Polyvinyl acetate PVAc1 100 parts by weight
Plasticizer (D931) 70 parts by weight
Ultraviolet ray screening agent (Tinuvin 326) in an amount of 0.2% by weight in the obtained first layer
Oxidation inhibitor (BHT) in an amount of 0.2% by weight in the obtained first layer
Preparation of Composition for Forming Second Layer and Third Layer:
The following ingredients were mixed, and kneaded sufficiently with a mixing roll to obtain a composition for forming a second layer and a third layer.
Polyvinyl acetal resin (PVB) 100 parts by weight
Plasticizer (D931) 30 parts by weight
Metal salt M (Mg mixture) in such an amount that Mg is 70 ppm in the obtained second layer and third layer
Ultraviolet ray screening agent (Tinuvin 326) in an amount of 0.2% by weight in the obtained second layer and third layer
Oxidation inhibitor (BHT) in an amount of 0.2% by weight in the obtained second layer and third layer
Preparation of Interlayer Film:
By coextruding the obtained composition for forming a first layer and the obtained composition for forming a second layer and a third layer using a coextruder, an interlayer film having a structure of a second layer (370 μm in thickness)/a first layer (100 μm in thickness)/a third layer (370 μm in thickness) was obtained.
At the time of extrusion molding, the second layer was caused to reach the center of the lateral surface of the first layer, and the third layer was caused to reach the center of the lateral surface of the first layer, and thus the lateral covering part was constituted of the second layer and the third layer. In the obtained interlayer film, the entire lateral surface of the first layer was covered with the lateral covering part.
(Evaluation)
(1) Shear Elastic Modulus
Viscoelasticity of the first layer was measured in the following manner.
A kneaded composition for forming a first layer was prepared. The kneaded composition was press-molded with a press molder at 150° C. to obtain a resin film having a thickness of 0.35 mm. The obtained resin film was left to stand for 2 hours at 25° C. and a relative humidity of 30%. After leaving to stand for 2 hours, viscoelasticity was measured using "ARES-G2" available from TA Instruments. As a jig, a parallel plate of 8 mm in diameter was used. Measurement was performed under the condition in which the temperature was decreased from 30° C. to −50° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.). The obtained interlayer film was stored in an environment at room temperature 23±2° C., relative humidity 25±5% for 1 month. Then in an environment at room temperature 23° C.±2° C., the second layer and the third layer were removed from the interlayer film by peeling off, and thus the first layer was obtained. The obtained first layer may be press molded at 150° C. so that the thickness was 0.35 mm (at 150° C. without pressurization for 10 minutes, at 150° C. under pressurization for 10 minutes) to prepare a resin film.

For the second and the third layers, viscoelasticity of the first layer was measured in the same manner as that for the first layer.

(2) Sound Insulating Properties

Sound insulating properties of the obtained laminated glass were evaluated using a sound box placed in a quiet room. The sound box is a box of 10 cm long, 10 cm wide, and 10 cm high formed by assembling 10 mm-thick wooden plate materials, and an opening of 7 cm long and 7 cm wide was provided on one face. A music player having a speaker was placed inside the sound box. Then laminated glass A prepared for measurement of the sound insulating properties was placed in the opening part, and the laminated glass A was fixed to the opening part by filling up the gap between the periphery of the laminated glass A and the opening part with clay. In the music player, beep sounds were recorded in advance so that beep sounds having a frequency of 500 Hz to 8000 Hz (beep sounds) come out of the speaker every constant time.

An evaluator listened to the sound from the music player in front of the laminated glass A disposed in the opening part of the sound box, and sensory-evaluated whether the beep signal sound leaking from the sound box through the laminated glass A does not increase at a specific frequency, and sound insulation is achieved uniformly from the lower frequency side to the higher frequency side.

When the evaluator could hear the beep signal sounds uniformly regardless of the frequency, the evaluation was "○", and when the evaluator heard at a specific frequency, a beep signal sound that is larger than those at other frequencies, the evaluation was "x".

(3) Foaming in End Part

Autoclaved laminated glass B was left to stand at 25° C. for 12 hours, and then baked in an oven at 50° C. for 3 days. After completion of the baking, the laminated glass B was taken out of the oven, and whether foaming occurs or not in 1 cm or less from the end part of the laminated glass was evaluated. The ranges within 1 cm from the corners of the laminated glass were excluded from evaluation. Foaming in end part was judged according to the following criteria.

[Criteria for Judgement in Foaming in End Part]
○: Foaming observed
x: Foaming not observed (4) Plate Slippage One face of the laminated glass C was fixed to a vertical face, and a reference line for measuring the slippage amount was marked on the lateral surface of the laminated glass, and the laminated glass was left to stand at 100° C. for 7 days. After 7 days, a slippage of two plates of glass of the evaluation sample was measured and evaluated. The plate slippage was judged according to the following criteria.

[Criteria for Judgment Plate Slippage]
○: 5 mm or less of slippage
x: more than 5 mm of slippage The details and the results are shown in the following Tables 1 to 4. In this connection, in the following Tables 1 to 4, the description of ingredients to be blended other than the resins such as the thermoplastic resin, and the plasticizer was omitted.

TABLE 1

| | | | | Example 1 | Example 2 | Example 3 | Example 4 | Example 5 |
|---|---|---|---|---|---|---|---|---|
| Composition for forming first layer | Polyvinyl acetal resin | Average polymerization degree of PVA | | 3000 | 3000 | 3000 | 3000 | 3000 |
| | | Content of hydroxyl group | mol % | 23.3 | 23.3 | 23.3 | 24.2 | 23.3 |
| | | Acetylation degree | mol % | 18.1 | 18.1 | 18.1 | 11.7 | 18.1 |
| | | Acetalization degree | mol % | 58.6 | 58.6 | 58.6 | 64.1 | 58.6 |
| | | Content | parts by weight | 100 | 100 | 100 | 100 | 100 |
| | Plasticizer | Kind | | 3GO | 3GO | 3GO | 3GO | 3GO |
| | | Content | parts by weight | 75 | 75 | 75 | 85 | 125 |
| | Compound (A) | Kind | | A1 | A2 | A2 | A2 | A2 |
| | | Content | parts by weight | 100 | 50 | 100 | 100 | 125 |
| Composition for forming second and third layers | Polyvinyl acetal resin | Average polymerization degree of PVA | | 1700 | 1700 | 1700 | 1700 | 1700 |
| | | Content of hydroxyl group | mol % | 30.6 | 30.6 | 30.6 | 30.6 | 30.6 |
| | | Acetylation degree | mol % | 0.9 | 0.9 | 0.9 | 0.9 | 0.9 |
| | | Acetalization degree | mol % | 68.5 | 68.5 | 68.5 | 68.5 | 68.5 |
| | | Content | parts by weight | 100 | 100 | 100 | 100 | 100 |
| | Plasticizer | Kind | | 3GO | 3GO | 3GO | 3GO | 3GO |
| | | Content | parts by weight | 35 | 35 | 35 | 39 | 35 |
| Formation of lateral covering part | | | | Formed | Formed | Formed | Formed | Formed |
| Evaluation | (1) Shear elastic modulus | First layer | MPa | 0.099 | 0.152 | 0.164 | 0.155 | 0.071 |
| | | Second layer, third layer, and lateral covering part | MPa | 15.8 | 15.8 | 15.8 | 3.7 | 15.8 |

TABLE 1-continued

| | | | | | | | | |
|---|---|---|---|---|---|---|---|---|
| (2) Sound insulating properties | | | | ○ | ○ | ○ | ○ | ○ |
| (3) Foaming in end part | | | | ○ | ○ | ○ | ○ | ○ |
| (4) Plate slippage | | | | ○ | ○ | ○ | ○ | ○ |

| | | | | Example 6 | Example 7 | Comparative example 1 | Comparative example 2 |
|---|---|---|---|---|---|---|---|
| Composition for forming first layer | Polyvinyl acetal resin | Average polymerization degree of PVA | | 3000 | 3000 | 3000 | 3000 |
| | | Content of hydroxyl group | mol % | 23.3 | 23.3 | 23.3 | 23.3 |
| | | Acetylation degree | mol % | 18.1 | 18.1 | 18.1 | 18.1 |
| | | Acetalization degree | mol % | 58.6 | 58.6 | 58.6 | 58.6 |
| | | Content | parts by weight | 100 | 100 | 100 | 100 |
| | Plasticizer | Kind | | DBEA | 3GO | 3GO | 3GO |
| | | Content | parts by weight | 100 | 120 | 75 | 75 |
| | Compound (A) | Kind | | A2 | A1-A2 | A1 | A2 |
| | | Content | parts by weight | 125 | 60-60 | 100 | 100 |
| Composition for forming second and third layers | Polyvinyl acetal resin | Average polymerization degree of PVA | | 1700 | 1700 | 1700 | 1700 |
| | | Content of hydroxyl group | mol % | 30.6 | 30.6 | 30.6 | 30.6 |
| | | Acetylation degree | mol % | 0.9 | 0.9 | 0.9 | 0.9 |
| | | Acetalization degree | mol % | 68.5 | 68.5 | 68.5 | 68.5 |
| | | Content | parts by weight | 100 | 100 | 100 | 100 |
| | Plasticizer | Kind | | DBEA | 3GO | 3GO | 3GO |
| | | Content | parts by weight | 35 | 35 | 35 | 35 |
| Formation of lateral covering part | | | | Formed | Formed | Not formed | Not formed |
| Evaluation | (1) Shear elastic modulus | First layer | MPa | 0.087 | 0.055 | 0.099 | 0.164 |
| | | Second layer, third layer, and lateral covering part | MPa | 15.8 | 15.8 | 15.8 | 15.8 |
| | (2) Sound insulating properties | | | ○ | ○ | ○ | ○ |
| | (3) Foaming in end part | | | ○ | ○ | x | x |
| | (4) Plate slippage | | | ○ | ○ | x | x |

TABLE 2

| | | | | Example 8 | Example 9 | Example 10 | Example 11 | Example 12 |
|---|---|---|---|---|---|---|---|---|
| Composition for forming first layer | Resin | Kind | | PEs1 | PEs2 | PEs2 | PEs2 | PEs2 |
| | | Content | parts by weight | 100 | 100 | 100 | 100 | 100 |
| | Plasticizer | Kind | | P1 | P1 | P1 | P1 | 3GO |
| | | Content | parts by weight | 36.5 | 80 | 100 | 120 | 80 |
| | Compound (A) | Kind | | — | A2 | A2 | A2 | A2 |
| | | Content | parts by weight | — | 100 | 100 | 100 | 100 |
| Composition for forming second and third layers | Resin | Kind | | PVB | PVB | PVB | PVB | PVB |
| | | Average polymerization degree of PVA | | 1700 | 1700 | 1700 | 1700 | 1700 |
| | | Content of hydroxyl group | mol % | 30.6 | 30.6 | 30.6 | 30.6 | 30.6 |
| | | Acetylation degree | mol % | 0.9 | 0.9 | 0.9 | 0.9 | 0.9 |
| | | Acetalization degree | mol % | 68.5 | 68.5 | 68.5 | 68.5 | 68.5 |
| | | Content | parts by weight | 100 | 100 | 100 | 100 | 100 |
| | Plasticizer | Kind | | P1 | P1 | P1 | P1 | 3GO |
| | | Content | parts by weight | 40 | 40 | 40 | 40 | 40 |
| Formation of lateral covering part | | | | Formed | Formed | Formed | Formed | Formed |
| Evaluation | (1) Shear elastic modulus | First layer | MPa | 0.133 | 0.043 | 0.048 | 0.046 | 0.030 |
| | | Second layer, third layer, and lateral covering part | MPa | 9.82 | 9.82 | 9.82 | 9.82 | 9.82 |

TABLE 2-continued

|  |  | Example 8 | Example 9 | Example 10 | Example 11 | Example 12 |
|---|---|---|---|---|---|---|
| (2) Sound insulating properties | Sound insulating properties | ○ | ○ | ○ | ○ | ○ |
| (3) Foaming in end part |  | ○ | ○ | ○ | ○ | ○ |
| (4) Plate slippage |  | ○ | ○ | ○ | ○ | ○ |

TABLE 3

|  |  |  | Ac1 | Ac2 | Ac3 | Ac4 |
|---|---|---|---|---|---|---|
| Ingredients | EA | parts by weight | 35 | 18 |  |  |
|  | HEA | parts by weight | 10 | 15 |  |  |
|  | BzA | parts by weight | 23 | 23 | 90.9 | 90.9 |
|  | BA | parts by weight | 32 | 44 |  |  |
|  | AMP-20GY | parts by weight |  |  | 9.1 | 9.1 |

TABLE 3-continued

|  |  | Ac1 | Ac2 | Ac3 | Ac4 |
|---|---|---|---|---|---|
| IRGACURE 184 | parts by weight | 0.2 | 0.2 | 0.2 | 0.2 |
| 3 GO | parts by weight |  |  | 15 |  |
| PB-3A | parts by weight |  |  |  | 25 |

The details of the components shown in Table 3 used in synthesis of (meth)acryl polymers Ac1, Ac2, Ac3 and Ac45 are as follows.

EA: ethyl acrylate (available from NIPPON SHOKUBAI CO., LTD.)

HEA: 2-hydroxyethyl acrylate (available from OSAKA ORGANIC CHEMICAL INDUSTRY LTD.)

BzA: benzyl acrylate (available from OSAKA ORGANIC CHEMICAL INDUSTRY LTD., Viscoat #160)

BA: butyl acrylate (available from NIPPON SHOKUBAI CO., LTD.)

AMP-20GY: phenoxypolyethyleneglycol acrylate (available from Shin-Nakamura Chemical Co., Ltd.)

3GO: triethylene glycol di-2-ethylhexanoate

IRGACURE 184: 2,2-dimethoxy-1,2-diphenylethan-1-one (available from BASF)

TABLE 4

|  |  |  |  | Example 13 | Example 14 | Example 15 | Example 16 | Example 17 |
|---|---|---|---|---|---|---|---|---|
| Composition for forming first layer | Resin | Kind |  | Ac1 | Ac2 | Ac3 | Ac4 | PVAc1 |
|  |  | Content | parts by weight | 100 | 100 | 100 | 100 | 100 |
|  | Plasticizer | Kind |  | — | — | 3GO | P1 | D931 |
|  |  | Content | parts by weight | — | — | 15 | 25 | 70 |
| Composition for forming second and third layers | Resin | Kind |  | PVB | PVB | PVB | PVB | PVB |
|  |  | Average polymerization degree of PVA |  | 1700 | 1700 | 1700 | 1700 | 1700 |
|  |  | Content of hydroxyl group | mol % | 30.6 | 30.6 | 30.6 | 30.6 | 30.6 |
|  |  | Acetylation degree | mol % | 0.9 | 0.9 | 0.9 | 0.9 | 0.9 |
|  |  | Acetalization degree | mol % | 68.5 | 68.5 | 68.5 | 68.5 | 68.5 |
|  |  | Content | parts by weight | 100 | 100 | 100 | 100 | 100 |
|  | Plasticizer | Kind |  | 3GO | 3GO | 3GO | 3GO | D931 |
|  |  | Content | parts by weight | 35 | 35 | 35 | 35 | 30 |
| Formation of lateral covering part |  |  |  | Formed | Formed | Formed | Formed | Formed |
| Evaluation | (1) Shear elastic modulus | First layer | MPa | 0.091 | 0.092 | 0.039 | 0.030 | 0.170 |
|  |  | Second layer, third layer, and lateral covering part | MPa | 15.8 | 15.8 | 15.8 | 15.8 | 11.4 |
|  | (3) Sound insulating properties | Sound insulating properties at 20° C., 3150 Hz | dB | ○ | ○ | ○ | ○ | ○ |
|  |  | Sound insulating properties at 20° C., 6300 Hz | dB | ○ | ○ | ○ | ○ | ○ |
|  | (4) Foaming in end part |  |  | ○ | ○ | ○ | ○ | ○ |
|  | (5) Plate slippage |  |  | ○ | ○ | ○ | ○ | ○ |

EXPLANATION OF SYMBOLS 1, 1A, 1B, 1C, 1D, 1E, 1F, 1G, 1H, 1I, 1J, 1X: First layer 2, 2A, 2B, 2C, 2D, 2E, 2F, 2G: Second layer 3, 3A, 3B, 3C, 3D, 3E: Third layer 4, 4A, 4B, 4C, 4D, 4E, 4F, 4G, 4H, 4I, 4J, 4X: Lateral covering part 11, 11A, 11B, 11C, 11D, 11E, 11F, 11G, 11H, 11I, 11J, 11X: Interlayer film 21, 21X: First lamination glass member 22, 22X: Second lamination glass member 31, 31X: Laminated glass

The invention claimed is:

1. An interlayer film for laminated glass having a one-layer structure or a two or more-layer structure, the interlayer film comprising:
   a first layer having a first principal surface and a second principal surface that are opposed to each other, and a lateral part connecting the first principal surface and the second principal surface; and
   a lateral covering part that covers at least part of the lateral part of the first layer,
   the first layer having a shear elastic modulus at 25° C. of 0.17 MPa or less, the lateral covering part having a shear elastic modulus at 25° C. of more than 1 MPa,
   the first layer consisting of a thermoplastic resin, a plasticizer which is different from the thermoplastic resin, and optionally, one or more of (a) one or more compounds having either a softening point or a melting point of 70° C. or more and 200° C. or less and being different from a polyvinyl acetal resin, (b) a heat shielding substance, (c) a metal salt, (d) an ultraviolet ray screening agent, and (e) an oxidation inhibitor, the thermoplastic resin contained in the first layer consisting of a thermoplastic resin other than a polyvinyl acetal resin.

2. The interlayer film for laminated glass according to claim 1, wherein lateral covering part contains a thermoplastic resin and a plasticizer.

3. The interlayer film for laminated glass according to claim 1, wherein
   the lateral covering part contains a thermoplastic resin and a plasticizer,
   a content of the plasticizer in the first layer, relative to 100 parts by weight of the thermoplastic resin in the first layer is larger than a content of the plasticizer in the lateral covering part, relative to 100 parts by weight of the thermoplastic resin in the lateral covering part by 15 parts by weight or more.

4. The interlayer film for laminated glass according to claim 1, wherein the lateral covering part has a thickness of 0.05 mm or more and 2 mm or less.

5. The interlayer film for laminated glass according to claim 1, wherein in 100% of a length of one round of the lateral part which is an outer periphery of the first layer, a length of the lateral part covered with the lateral covering part is 15% or more and 100% or less.

6. The interlayer film for laminated glass according to claim 1, wherein in 100% of an entire surface area of the lateral part of the first layer, a surface area covered with the lateral covering part is 15% or more and 100% or less.

7. The interlayer film for laminated glass according to claim 1, wherein
   the interlayer film is an interlayer film for laminated glass having a two or more-layer structure, and
   the interlayer film for laminated glass further comprises a second layer arranged on the first principal surface of the first layer.

8. The interlayer film for laminated glass according to claim 7, wherein the second layer covers at least part of the lateral part of the first layer by reaching at least part of the lateral part of the first layer, and the lateral covering part is constituted by the second layer.

9. The interlayer film for laminated glass according to claim 7, wherein the second layer is made of a material that is different from a material of the lateral covering part.

10. The interlayer film for laminated glass according to claim 7, wherein the second layer contains a thermoplastic resin and a plasticizer.

11. The interlayer film for laminated glass according to claim 7, wherein
    the interlayer film is an interlayer film for laminated glass having a three or more-layer structure, and
    the interlayer film for laminated glass further comprises a third layer arranged on the second principal surface of the first layer.

12. The interlayer film for laminated glass according to claim 11, wherein the third layer covers at least part of the lateral part of the first layer by reaching at least part of the lateral part of the first layer, and the lateral covering part is constituted by the third layer.

13. The interlayer film for laminated glass according to claim 11, wherein the third layer is made of a material that is different from a material of the lateral covering part.

14. The interlayer film for laminated glass according to claim 11, wherein the third layer contains a thermoplastic resin and a plasticizer.

15. The interlayer film for laminated glass according to claim 1, wherein when the interlayer film has a thickness T, the first layer has a thickness of 0.06T or more.

16. The interlayer film for laminated glass according to claim 1, further comprising at least one selected from the group consisting of platinum particles, platinum particles coated with silica, palladium particles, and palladium particles coated with silica.

17. The interlayer film for laminated glass according to claim 1, further comprising at least one selected from the group consisting of a phthalocyanine compound, a naphthalocyanine compound, and an anthracyanine compound.

18. A laminated glass comprising:
    a first lamination glass member;
    a second lamination glass member; and
    the interlayer film for laminated glass according to claim 1,
    the interlayer film for laminated glass being arranged between the first lamination glass member and the second lamination glass member.

19. The laminated glass according to claim 18, wherein the lateral covering part of the interlayer film for laminated glass reaches on at least part of lateral parts of the first lamination glass member and the second lamination glass member.

* * * * *